(12) United States Patent
Achterman

(10) Patent No.: US 7,591,282 B1
(45) Date of Patent: Sep. 22, 2009

(54) DAMPED, SELF-CLEANING FLOW SHUTOFF VALVE AND ASSOCIATED METHODS

(75) Inventor: Kermit L. Achterman, La Canada Flintridge, CA (US)

(73) Assignee: Kermit L. Achterman & Associates, Inc., La Canada Flintridge, CA (US)

(*) Notice: Subject to any disclaimer, the term of this patent is extended or adjusted under 35 U.S.C. 154(b) by 0 days.

(21) Appl. No.: 12/402,389

(22) Filed: Mar. 11, 2009

Related U.S. Application Data

(63) Continuation-in-part of application No. 12/170,721, filed on Jul. 10, 2008, now Pat. No. 7,503,341, which is a continuation-in-part of application No. 11/689,104, filed on Mar. 21, 2007, which is a continuation-in-part of application No. 11/535,194, filed on Sep. 26, 2006, now Pat. No. 7,552,743.

(51) Int. Cl.
*F16K 31/12* (2006.01)
(52) U.S. Cl. .................. 137/498; 137/514.5; 137/460
(58) Field of Classification Search ............ 137/516.25, 137/517, 497, 498, 460, 514.5, 514.3, 512.1, 137/515.5
See application file for complete search history.

(56) References Cited

U.S. PATENT DOCUMENTS

| 735,248 | A |   | 8/1903 | Hahn |
|---|---|---|---|---|
| 1,796,455 | A |   | 3/1931 | Gunn et al. |
| 2,307,949 | A |   | 1/1943 | Phillips |
| 2,415,258 | A |   | 2/1947 | Parker et al. |
| 2,460,407 | A |   | 2/1949 | Andrus |
| 2,481,713 | A |   | 9/1949 | Bertea |
| 2,502,525 | A | * | 4/1950 | Krugler ............... 62/50.7 |
| 2,633,147 | A |   | 3/1953 | Badami |
| 2,912,000 | A |   | 11/1959 | Green |
| 2,924,237 | A |   | 2/1960 | Ellis |
| 3,441,052 | A |   | 4/1969 | Schilling |

(Continued)

OTHER PUBLICATIONS

Non-Final Office Action from USPTO dated Aug. 4, 2008 for relating U.S. Appl. No. 11/535,194.

(Continued)

*Primary Examiner*—John Rivell
*Assistant Examiner*—Macade Brown
(74) *Attorney, Agent, or Firm*—Klein, O'Neill & Singh, LLP

(57) ABSTRACT

The valve comprises a housing defining a flow passage, an outer cylindrical wall, an inner cylindrical wall, and a valve seat. An annular cavity is formed between the outer cylindrical wall and the inner cylindrical wall. A valve member is slidably mounted within the housing. The valve member includes an annular skirt section extending in the downstream direction. A downstream-facing portion of the valve member comprises a sealing portion configured to selectively engage the valve seat. The valve member is movable between an upstream no flow position, a downstream shutoff position, and a normal flow position intermediate the no flow position and the shutoff position. A biasing element is disposed between the housing and the valve member so as to bias the valve member away from the valve seat. When the valve member moves from the normal flow position to the shutoff position, the annular skirt section penetrates the annular cavity and displaces water therefrom to dampen the downstream movement of the valve member.

16 Claims, 22 Drawing Sheets

U.S. PATENT DOCUMENTS

| | | | |
|---|---|---|---|
| 3,566,918 A | | 3/1971 | Rauen |
| 3,664,371 A | | 5/1972 | Schneider |
| 3,735,777 A | * | 5/1973 | Katzer et al. ............. 137/514.5 |
| 3,850,195 A | | 11/1974 | Olsson |
| 3,958,603 A | | 5/1976 | Bannon et al. |
| 4,590,962 A | * | 5/1986 | Tespa ......................... 137/498 |
| 5,240,036 A | | 8/1993 | Morris |
| 5,487,406 A | | 1/1996 | Jirasek |
| 5,857,716 A | | 1/1999 | Thomas |
| 5,976,631 A | | 11/1999 | Ramachandran |
| 6,325,090 B1 | | 12/2001 | Horne et al. |
| 6,513,543 B1 | | 2/2003 | Noll et al. |
| 7,111,638 B2 | | 9/2006 | Johnson |

OTHER PUBLICATIONS

Non-Final Office Action from USPTO dated Oct. 7, 2008 for relating U.S. Appl. No. 11/689,104.

Notice of Allowance from USPTO dated on Nov. 10, 2008 for relating U.S. Appl. No. 12/170,721.

Notice of Allowance from USPTO dated on Feb. 6, 2009 for relating U.S. Appl. No. 11/535,194.

Final Office Action from USPTO dated Apr. 13, 2009 for relating U.S. Appl. No. 11/689,104.

\* cited by examiner

DAMPED, SELF-CLEANING FLOW SHUTOFF VALVE AND ASSOCIATED METHODS

CROSS-REFERENCE TO RELATED APPLICATIONS

This application is a continuation-in-part of application Ser. No. 12/170/721, filed on Jul. 10, 2008 now U.S. Pat. No. 7,503,341, which is a continuation-in-part of application Ser. No. 11/689,104, filed on Mar. 21, 2007, which is a continuation-in-part of application Ser. No. 11/535,194, filed on Sep. 26, 2006 now U.S. Pat. No. 7,552,743. The disclosures of all of the prior applications are incorporated herein by reference in their entireties.

BACKGROUND

1. Technical Field

The present embodiments are related to flow shutoff valves for water lines, and, more specifically, self-cleaning flow shutoff valves.

2. Description of Related Art

Shutoff valves to prevent excess flow, such as when a sudden leak occurs downstream of the valve, are well known in the art. Such valves are found in high pressure hydraulic systems, fueling systems and critical gas systems. Such valves are relatively expensive because of complicated housings and/or valve elements, costly materials, and precision machining requirements.

Public water supplies to appliances, sinks and toilets are often connected to manual shutoff valves that are installed in the water line. The conventional means for connecting the manual shutoff valves to an appliance, or the like, are typically through flexible hoses. Personal experience and insurance statistics suggest that a great many such manual shutoff valves are not closed when appliances are not in use. Consequently, the integrity of the flexible hoses remains the only means of containing water pressure to an appliance. Insurance companies in North America report payments amounting to hundreds of millions of dollars annually that solely result from broken appliance hoses. Other statistics for sinks and toilet systems, not using flexible hoses, but which are subject to leaking or other problems, are similar.

The shutoff valves used for hydraulics, fuels and gases are out of practical range for use with appliances. However, other solutions have been applied to the problem of flooding from appliance hoses in a number of ways. Electrical sensors, timers and valve drives have been devised. Mechanical devices have also been employed, but are complicated, expensive and/or limited in their use.

One problem that must be addressed by shutoff devices is the presence of particles and hardness in the water supply, which can accumulate to disable such valves. The utility of most shutoff valves is as an emergency device with very infrequent actuation. Consequently, interfering deposits can build up with continued flow through the valve without actuation and result in malfunction of the valve when needed.

SUMMARY

The preferred embodiments of the present damped, self-cleaning flow shutoff valve and associated methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description of the Preferred Embodiments," one will understand how the features of the present embodiments provide advantages, which include reliable actuation and self-cleaning, which reduces the buildup of sediment deposits that can lead to clogs and subsequent malfunctions.

One embodiment of the present damped, self-cleaning flow shutoff valve comprises a housing defining a flow passage, an outer cylindrical wall, an inner cylindrical wall, and a valve seat. An annular cavity is formed between the outer cylindrical wall and the inner cylindrical wall. A valve member is slidably mounted within the housing. The valve member includes an annular skirt section extending in the downstream direction. A downstream-facing portion of the valve member comprises a sealing portion configured to selectively engage the valve seat. The valve member is movable between an upstream no flow position, a downstream shutoff position, and a normal flow position intermediate the no flow position and the shutoff position. A biasing element is disposed between the housing and the valve member so as to bias the valve member away from the valve seat. When the valve member moves from the normal flow position to the shutoff position, the annular skirt section penetrates the annular cavity and displaces water therefrom to dampen the downstream movement of the valve member.

One embodiment of the present method of stopping flow in a water line in response to an excess water flow condition comprises beginning with a flow shutoff valve in the water line in an upstream no flow position in which a protruding boss on a housing of the valve engages an opening in an upstream end of a valve member, and a sealing portion of the valve member is spaced from a valve seat located downstream of the valve member. The method further comprises creating a differential pressure across the valve member in which a downstream water pressure is less than an upstream water pressure to move the valve member to a normal flow position in which the upstream end of the valve member is spaced from the boss, and the sealing portion is spaced from the valve seat. The method further comprises increasing a water flow rate across the valve member above a threshold flow rate to move the valve member to a downstream shutoff position in which the upstream end of the valve member is spaced from the boss, and the sealing portion engages the valve seat. In the method, the housing defines the valve seat, an annular cavity is formed between a wall of the housing and a wall of the valve seat, and the valve member includes an annular skirt section extending in the downstream direction. As the valve member moves from the normal flow position to the shutoff position, the annular skirt section penetrates the annular cavity and displaces water therefrom to dampen the downstream movement of the valve member.

BRIEF DESCRIPTION OF THE DRAWINGS

The preferred embodiments of the present damped, self-cleaning flow shutoff valve and associated methods now will be discussed in detail with an emphasis on highlighting the advantageous features. These embodiments depict the novel and non-obvious valve shown in the accompanying drawings, which are for illustrative purposes only. These drawings include the following figures, in which like numerals indicate like parts.

DETAILED DESCRIPTION

Figure 1:
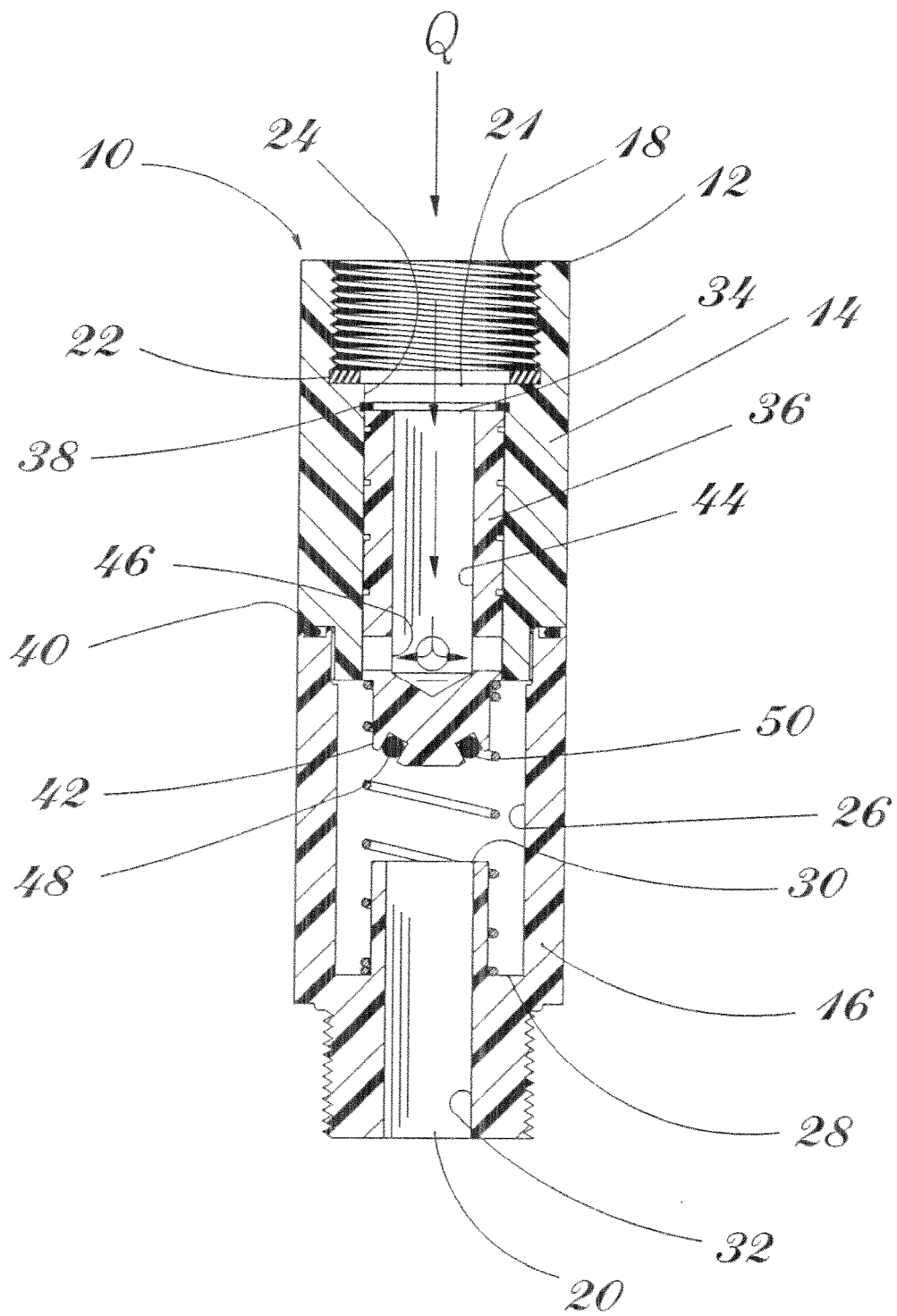
FIG. 1 is a cross-sectional view taken along the centerline of a flow shutoff valve in a position with no flow therethrough.

In the detailed description that follows, the present embodiments are described with reference to the drawings. In the drawings, elements of the present embodiments are labeled with reference numbers. These reference numbers are reproduced below in connection with the discussion of the corresponding drawing features. Throughout the figures, the arrow labeled "Q" indicates the direction of flow.

Figure 2:
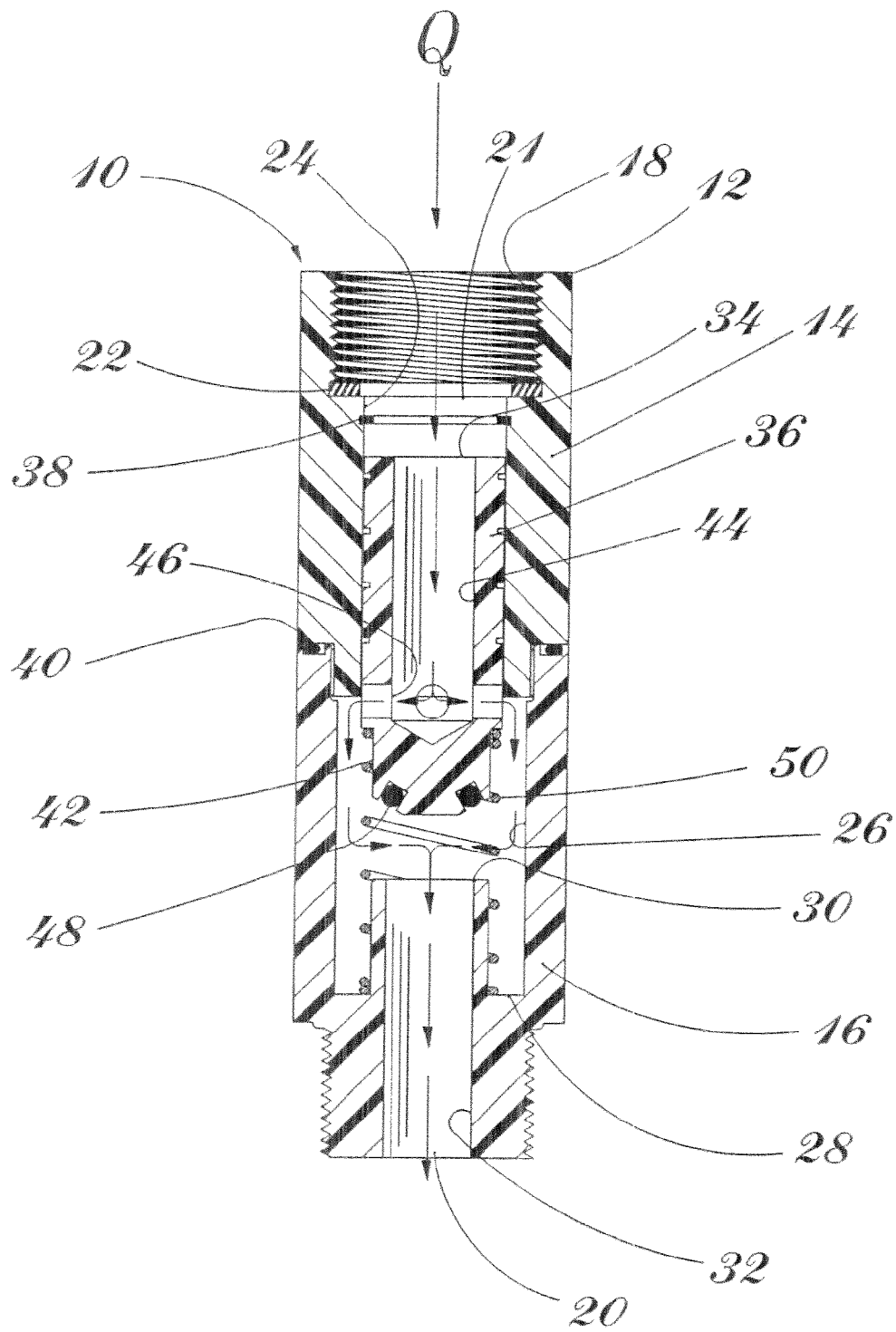
FIG. 2 is a cross-sectional view taken along the centerline of the flow shutoff valve in an intermediate position with flow therethrough.
Figure 3:
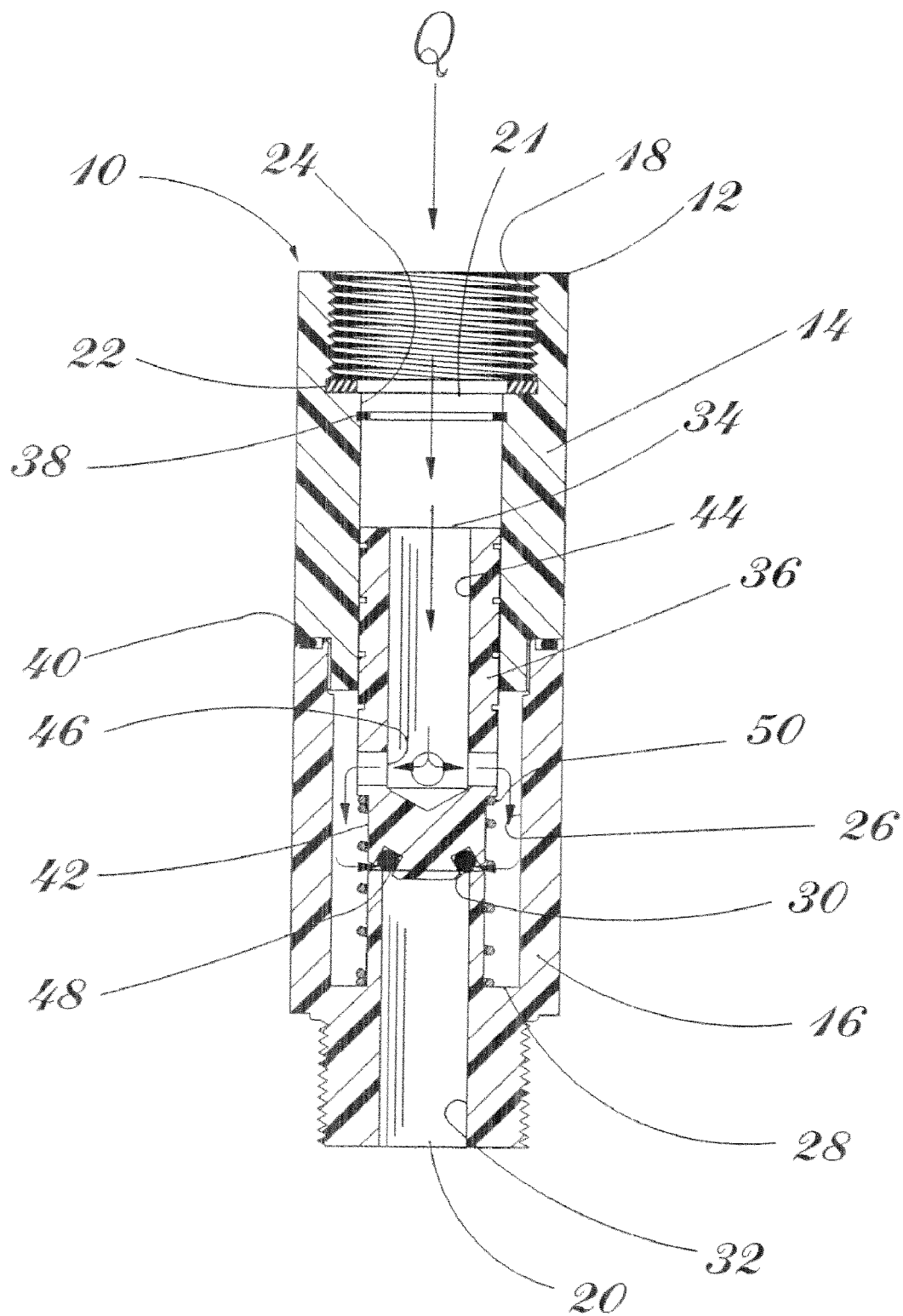
FIG. 3 is a cross-sectional view taken along the centerline of a flow shutoff valve in a shutoff position.

Turning in detail to FIGS. 1-3, a self-cleaning flow shutoff valve for public water line pressure is disclosed. The flow shutoff valve, generally designated 10, includes a housing 12. The housing 12 is constructed of an inlet section 14, and an outlet section 16. These sections may conveniently be of inexpensive plastic molding material. Such materials include polyvinyl chloride (PVC), chlorinated polyvinyl chloride (CPVC), acrylonitrile butadiene styrene (ABS) and other plastics. Brass or bronze may alternatively be employed. The sections 14, 16 are generally cylindrical. "Cylindrical" is used herein in the broader mathematical sense without necessarily being limited to a circular cylinder.

The inlet section 14 includes an inlet 18. The outlet section 16 includes an outlet 20. The inlet 18 and outlet 20 sections are shown to be threaded with female and male threads, respectively. The entire body of the housing 12 is preferably cylindrical at any cross section and the two sections 14, 16 include male and female engaged pilot diameters. The two sections 14, 16 may be bonded together or threaded together with an o-ring seal 40.

The resulting housing 12 defined by the two sections 14, 16 includes a passage 21 therethrough extending from the inlet 18 to the outlet 20. The passage 21 includes a washer 22 arranged at the inlet to prevent flow from backing out through the inlet 18.

The passage 21 further includes a cylindrical section 24 found inwardly of the inlet 18 and washer 22. This section 24 extends to a central section 26 of enlarged cross section also forming part of the passage 21. At one end of the central section 26, an annular spring seat 28 is arranged to accommodate a spring inwardly displaced from the wall of the passage 21 at the central section 26. A valve seat 30 is also located in the central section 26 at the annular spring seat 28. The valve seat 30 extends around the passage 21 as it defined an outlet channel 32.

A valve element 34 includes a cylindrical wall about its periphery which slidably engages the cylindrical section 24. The body 36 of the valve element 34 is of sufficient length and fit so that it will not bind with the cylindrical bore 24 in movement within the passage 21 and yet precludes any substantial flow between the cylindrical wall and the cylindrical section 24. The clearance between the body 36 and the cylindrical bore 24 is small but does not require that all fluid flow therebetween be prevented. A retaining ring 38 fits within a groove in the passage 21 at the first section 24. A spring clip may be employed for this ring 38. This limits the travel of the valve element 34 toward the inlet 18. A nose 42 of smaller diameter than the body 36 extends downwardly below the cylindrical wall of the body 36. A flow restrictive passage is located between the inlet and the outlet with communication therethrough controlled by the valve element 34.

In the preferred embodiment, the flow restrictive passage is defined by a central cavity 44 extending into the body of the valve element 34 from the inlet end. The cavity 44 does not extend fully through the valve element 34. Rather, several orifices 46 extend from the cavity 44 in a radial direction to the periphery of the valve element 34 for communication between the inlet and the outlet. Further the central section 26 can provide communication from the orifices 46 to the valve seat 30. A sealing surface 48 is arranged on the end of the nose 42 to cooperate with the valve seat 30 for closure of the passage 21. A spring 50 is positioned in the annular spring seat 28 and is placed in compression against the shoulder created by the diameter change in the valve element 34. The spring 50 biases the valve element 34 toward the inlet and against the retaining ring 38.

In comparing FIGS. 1, 2 and 3, it may be noted that the valve element 34 is shown in three functional positions. A first position, as illustrated in FIG. 1, is with the valve element 34 positioned fully toward the inlet 18. A second position, as illustrated in FIG. 2, is an intermediate position with the orifices 46 in communication with the central section 26 and the valve 10 open. The second position actually spans a range of locations for the valve element 34. A third position, as illustrated in FIG. 3, is with the sealing surface 48 pressed against the valve seat 30. In the first position, the orifices 46 are closed by the cylindrical section 24 which closely surrounds the cylindrical periphery of the valve element 34. In this way, communication through the flow restrictive passage is closed. With no open passage, pressure builds up on the top of the valve element 34, which, in turn, acts as a piston and is forced downwardly by the water pressure every time the valve is opened. With the added force of the piston, the valve element 34 is cleared of any accumulation of particles and hardness on a regular basis. Further, the valve remains open with the sealing surface 48 displaced from the valve seat 30.

In the second position, flow proceeds relatively unimpeded by the mechanism with the exception of the design of the orifices 46. Under normal flow conditions, the valve element 34 remains in this intermediate position. In the third position, the sealing surface 48 is on the valve seat 30 and there is no flow. It is through this range of positions that the flow shutoff valve 10 operates.

The spring 50 and the orifices 46 are empirically selected to accommodate public water line pressure and household appliance flow rates. At normal flow, there is some pressure drop across the valve element 34. This pressure drop is due to flow resistance through the orifices 46 and general drag on the valve element 34. This pressure drop along with pressure imbalances resulting from velocity variations around the valve element 34 provides differential forces on the valve element 34. However, the orifices 46 and the spring 50 are selected to allow a certain range of flow through the flow shutoff valve 10 at a range of line pressures with the spring 50 retaining the valve element 34 in the intermediate zone of positions. This is accomplished by having the spring maintain a range of force on the valve element 34 that the hydraulic forces do not move the valve element 34 fully to the third position against the valve seat 30. Naturally, the spring 50 cannot resist the piston action of the valve element 34 as it moves from the first position to expose the orifices 46. As the public water line pressure is reasonably stable during such flow, the back pressure at the outlet 20 significantly determines flow rate. This back pressure is developed at an appliance or other device in fluid communication with the outlet 20.

When the back pressure at the outlet 20 drops significantly, the differential pressure between the inlet 18 and the outlet 20 becomes substantially greater. In response, flow through the flow shutoff valve 10 increases. As the flow increases, greater resistance is provided by the orifices 46. Resulting hydraulic forces acting in the direction of flow increase. At a flow rate between 150% and 200% of anticipated normal flow, the resulting hydraulic force on the valve element 44 exceeds the opposing spring force from the compressed spring 50. Preferably the spring 50 is arranged such that the distance between the first and third positions does not greatly increase the spring force. This is accomplished with some precompression of the spring 50 in the first position and a small spring constant. With the resulting hydraulic force exceeding the spring force, the valve element 34 will move to the third position with the sealing surface 48 against the annular valve seat 30. As the sealing surface 48 engages the valve seat 30, flow is terminated.

Once there is no flow, the pressure about the valve element 34 equalizes at the line pressure. At this point, the only forces on the valve element 34 are the spring 50 and the imbalance between the line pressure and the lower pressure at the outlet channel 32 operating on the valve element 34 inwardly of the valve seat 30. With the outlet 20 being near zero gauge pressure, the differential pressure across the area of the outlet channel 32 retains the valve element 34 in the third position.

Reinstating the flow shutoff 10 to the first or second positions is accomplished by reducing the line pressure sufficiently so that the spring 50 may force the valve element 34 back toward the inlet 18.

Figure 5:
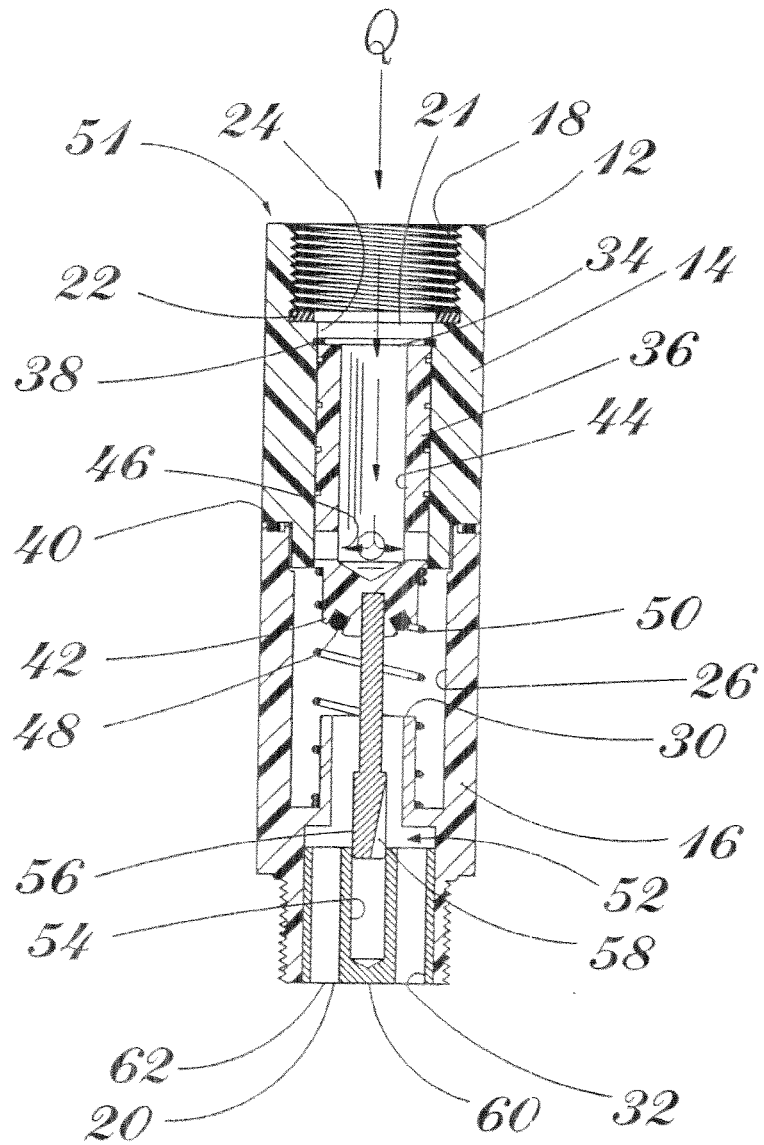
FIG. 5 is a cross-sectional view taken along lines 5-5 of FIG. 4.
Figure 4:
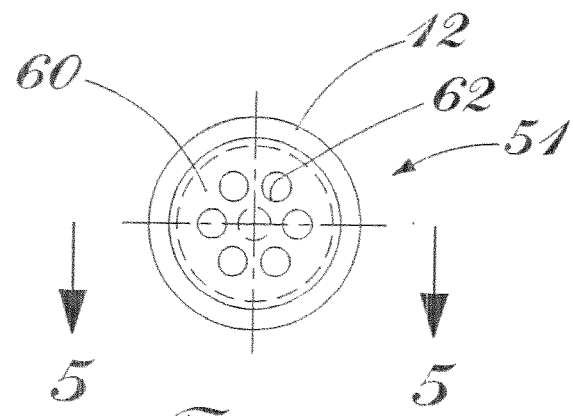
FIG. 4 is a bottom view of a second embodiment of a flow shutoff valve.

The second embodiment illustrated in FIGS. 4 and 5 includes the reference numbers applied to the first embodiment where functions are substantially identical. This second embodiment of the flow shutoff valve, generally designated 51 principally differs in the provision of a motion damper, generally designated 52. The motion damper includes a cavity 54 associated with the housing 12 and a plunger 56 associated with the valve element 34. The first position of the valve element 34, as seen in FIG. 5, has the plunger 56 just entering the cavity 54. In the intermediate position the plunger 56 has more fully entered into the cavity 54 but has not bottomed out. For a first distance, the plunger 56 increases in cross-sectional area by means of the chamfer 58. With this device, the damping resistance is progressive with displacement of the valve element 34 from the intermediate position toward the valve closed position.

To accommodate the motion damper 52, the housing 12 includes an insert 60, centrally defining the cavity 54, with multiple ports 62 thereabout. The ports are substantially larger in cumulative cross-section than the orifices 46. This allows a rapid drop in pressure below the valve element 34 with resulting closure of the shutoff valve 51 when pressure at the outlet 20 drops to near zero gauge. The insert 60 may be press fit or retained by bonding. A further variation from the first embodiment may be the employment of slip sockets, as the shutoff valve 51 is depicted in FIG. 7, particularly adaptable with PVC, CPVC and ABS type piping systems for bonding of the system components to the valve 51.

Figure 6:
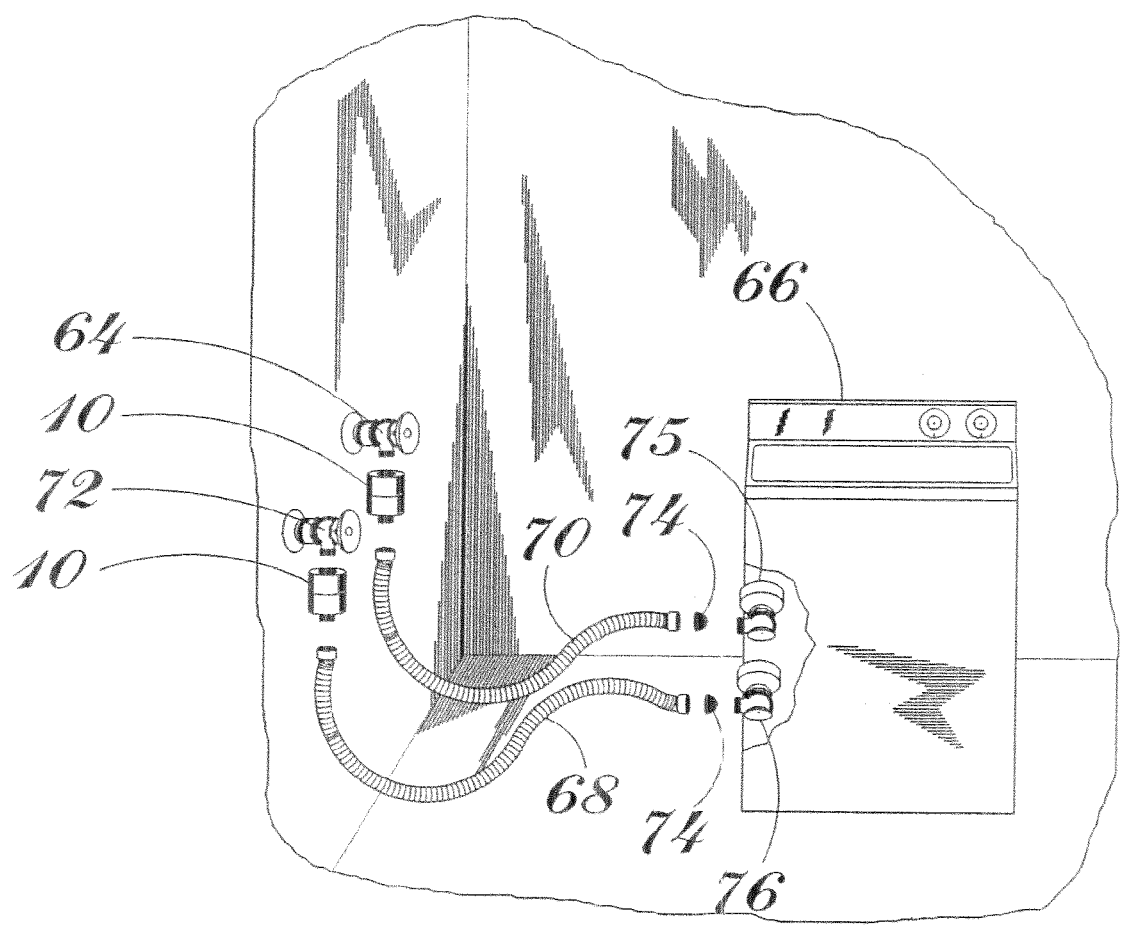
FIG. 6 is a perspective exploded assembly view of flow shutoff valves with an appliance.

FIG. 6 illustrates the use of flow shutoff valves 10 with a home appliance such as a washing machine 66. Flexible hoses 68, 70 are coupled with the flow shutoff valves 10 which are in turn coupled with the standard manual valves 64, 72. In the circumstance that a flexible hose 68, 70 breaks, water pressure within the hose and correspondingly at the outlet 20 would drop to near zero gauge pressure. Under this circumstance, the flow shutoff valve 10 would close by having the valve element 34 moved to the third position. The corresponding valve 64, 72 must then be closed before flow is restored through the flow shutoff valve 10.

The hoses 68 and 70 have proximal ends adjacent the shutoff valve 10 and distal ends at the appliance 66 or other device. A line filter 74 may be located adjacent the distal end of each of the hoses 68 and 70, where they connect to the appliance solenoid valves, 75 and 76, and no line filter is located adjacent the proximal end of the hoses 68 and 70 or the flow shutoff valve 10. As indicated above, particles and hardness accumulate from the domestic water line. If there is a filter before the flow shutoff valve 10, there is the danger of sufficiently clogging the line filter enough that flow would never reach the shutoff velocity through the flow shutoff valve 10 to properly actuate with a break in the hose. By placing line filters after the hoses, the increased flow from a break would not be reduced by an upstream clogged line filter.

Figure 7:
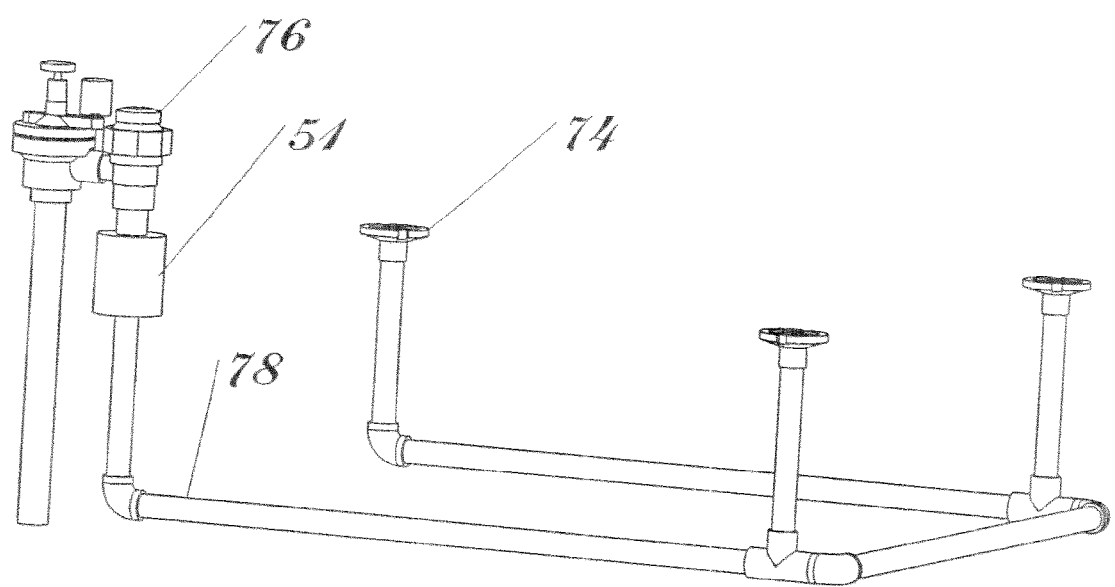
FIG. 7 is a perspective view of a flow shutoff valve with a sprinkler system.

FIG. 7 illustrates a sprinkler system including sprinklers 74, an anti-siphon valve 76 and sprinkler pipes 78. The motion damper 52 of the second embodiment has particular utility in the sprinkler system of FIG. 7. When the anti-siphon valve 76 is closed, the anti-siphon operates to release pressure and drain some of the sprinkler pipe 78. Therefore, when the anti-siphon valve is again opened, there is the possibility that the sprinkler piping 78, and correspondingly the outlet 20, will be at near zero gauge pressure until filled by line water.

Without slowing the closure of the valve, this condition could prematurely close the shutoff valve.

Turning now to the third embodiment shown in FIGS. 8 through 11, a self-cleaning flow shutoff valve for public water line pressures and for connection to or use with a stop valve is disclosed. This flow shutoff valve is a miniaturized version for use in specific situations and is generally designated 110. A currently preferred version of this miniaturized flow shutoff valve is approximately 3/4 in. (19 mm) in diameter by about 1.4 in. (35.6 mm) long. This flow shutoff valve 110 includes a housing 112, preferably constructed from metal and having an inlet section 114, an outlet section 116, sealed with an O-ring 126, and an outlet adapter 118. An O-ring seal 150 is used between the outlet section 116 and the outlet adapter 118. The sections 114, 116, and 118 are generally cylindrical. "Cylindrical" is used herein in the broader mathematical sense without necessarily being limited to a circular cylinder.

The inlet section 114 includes an inlet 120. The outlet adapter 118 includes an outlet 122. The inlet section 114 and the outlet adapter 118 are shown to be threaded with exterior male treads. The exterior threads on inlet section 114 provide for integration of the valve 110 into or with a standard commercial stop valve, such as 123 (see FIG. 12). The threads on outlet adapter 118 are varied to match a broad range of plumbing requirements. The entire housing 112 is preferably cylindrical at any cross section and the two sections 114, 116 may be bonded or threaded together. A poppet guide and metering slot insert 124 (best shown in FIG. 11) is fitted into the smooth bore of the inlet section 114, and is sealed with two O-rings 126. This poppet guide and metering slot insert 124 is preferably made from a ceramic or a glass filled polypropylene.

The resulting housing 112 defined by the three sections 114, 116, and 118 includes a passage 121 therethrough extending from the inlet 120 to the outlet 122. The passage 121 further includes a series of metering slots 128 formed in the poppet guide and metering slot insert 124.

The passage 121 further includes a cylindrical section 130 found inwardly of the inlet 120. This section 130 is preferably formed in the poppet guide and metering slot insert 124 and extends to a central section 132 also forming part of the passage 121. At one end of the central section 132 an annular spring seat 134 is arranged to accommodate a spring 136 inwardly displaced from the wall of passage 121 at the central section 132. A valve seat 138 is also located in the central section 132 at an end of the annular spring seat 134. The valve seat 138 extends around the passage 121 as it defines an outlet channel 140.

A cylindrical poppet type valve element 142 slidably engages the cylindrical section 130 of the poppet guide and metering slot insert 124. The body 144 of valve element 142 is of sufficient length and fit so that it will not bind with the cylindrical bore 130 in movement within the passage 121 and yet precludes any substantial flow between the body 144 and the cylindrical section 130. The clearance between the body 144 and the cylindrical section 130 of the poppet guide and metering slot insert 124 does not require that all fluid flow therebetween be prevented.

A nose 146 of smaller diameter than the body 144 of the valve element 142 extends downwardly, below the cylindrical housing 112. A valve O-ring sealing surface 148 is fitted to the nose 146 of the valve element 142.

A flow restrictive passage is located between the inlet 120 and the outlet 122 with communication therethrough controlled by the width and number of metering slots 128 in the poppet guide and metering slot insert 124. In the preferred embodiment, the flow restrictive passage is defined as the metering slots 128 which are cut into, or otherwise formed in the insert 124.

The number and width of slots 128 determine the amount of flow restriction. Further, the central section 132 can provide communication from the metering slots 128 to the valve seat 138. The sealing surface 148 is arranged on the end of the nose 146 to cooperate with the valve seat 138 for closure of the passage 121.

The spring 136 is positioned in the annular spring seat 134 and is placed in compression against the shoulder create by the diameter change in the body 144 of the valve element 142. The spring 136 biases the valve element 142 toward the inlet 120.

Figure 8:
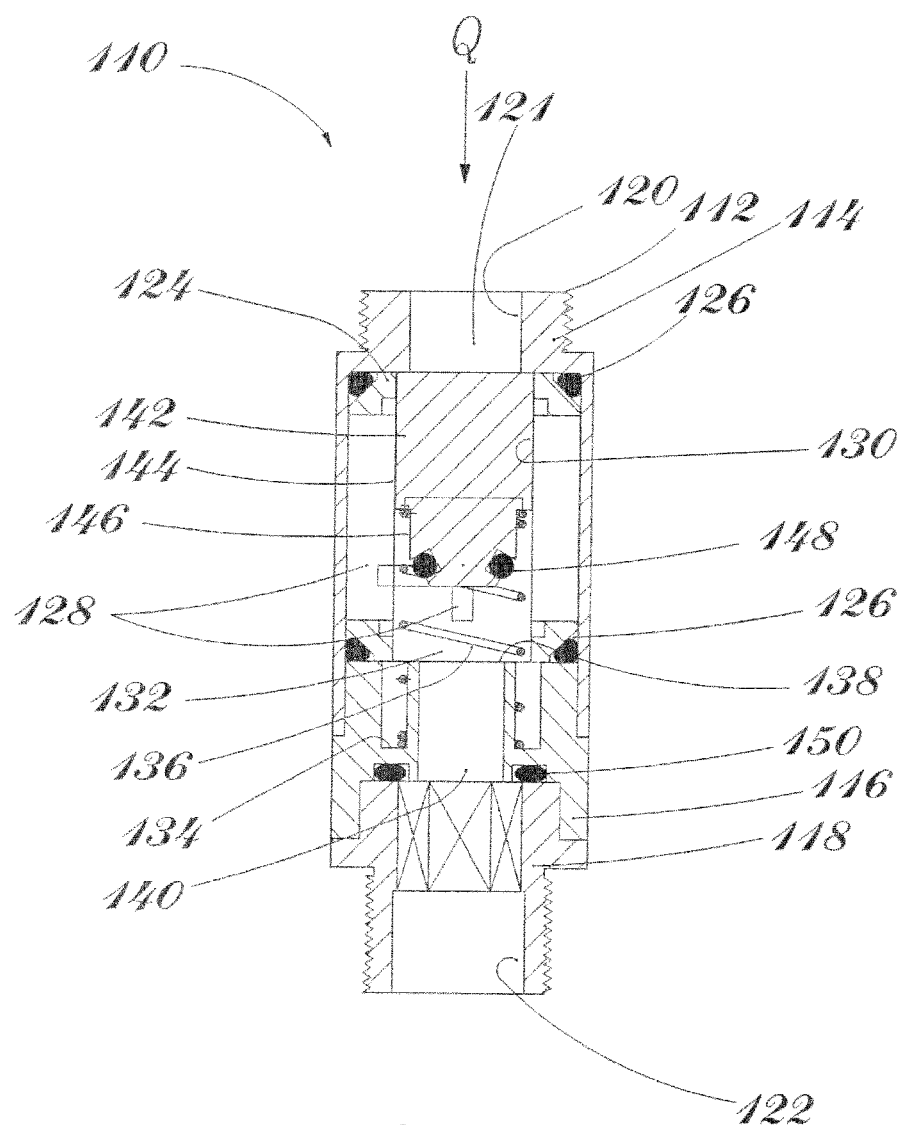
FIG. 8 is a cross-sectional view taken along the centerline of a third embodiment of a flow shutoff valve, in a position with no flow therethrough, for use with a stop valve.
Figure 9:
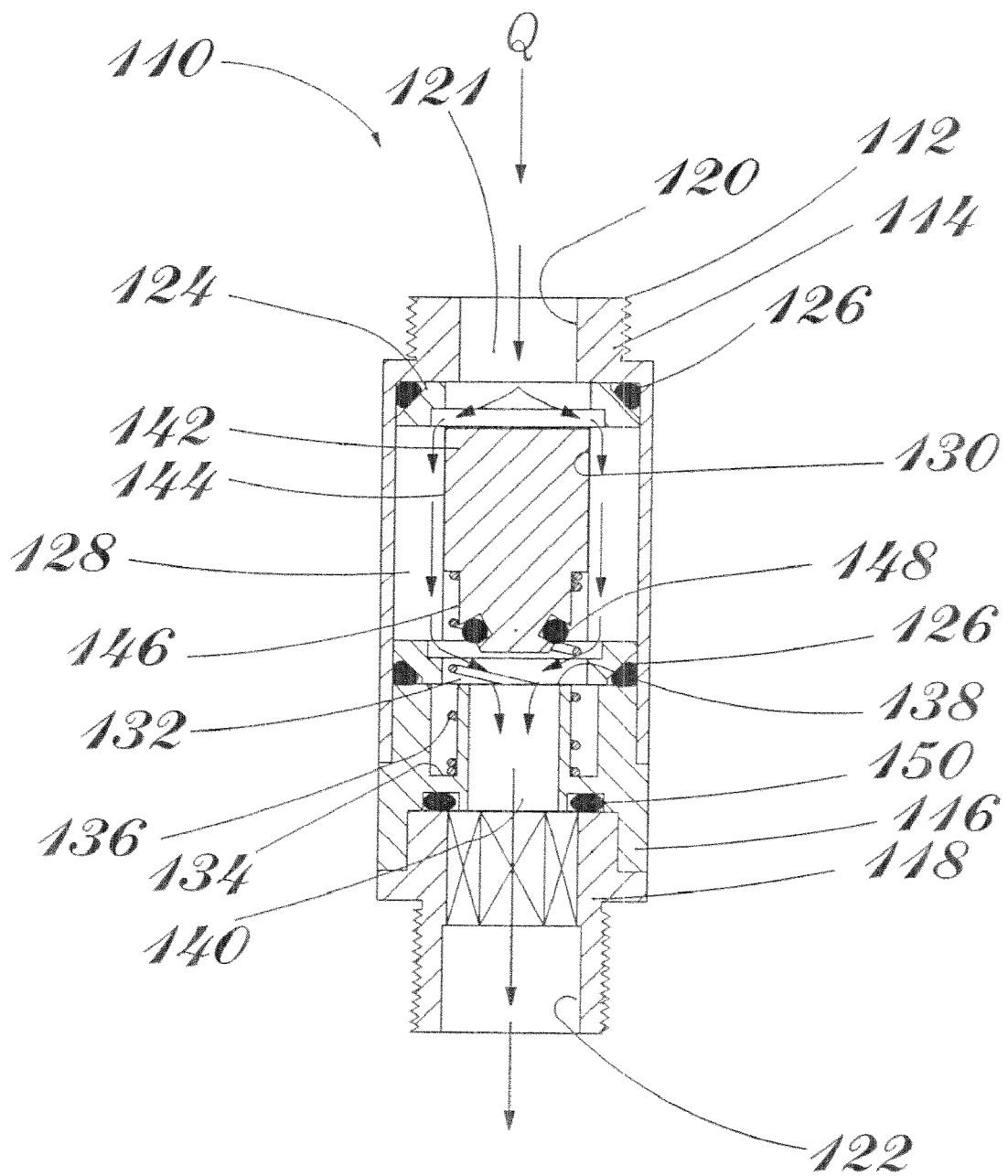
FIG. 9 is a cross-sectional view of the flow shutoff valve of FIG. 8, in an intermediate position with flow therethrough.
Figure 10:
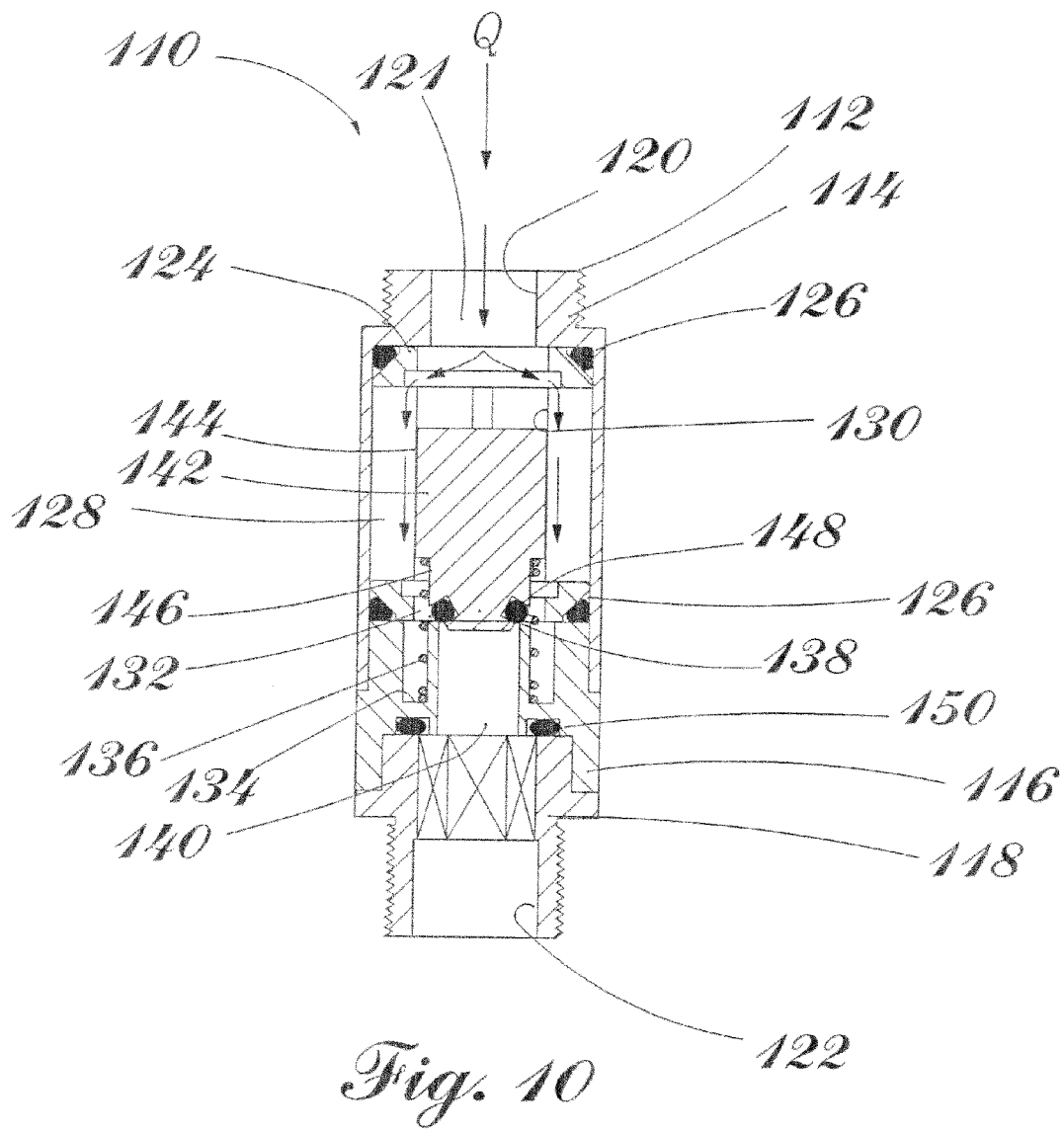
FIG. 10 is a cross-sectional view of the flow shutoff valve of FIG. 8, in a shutoff position.
Figure 11:
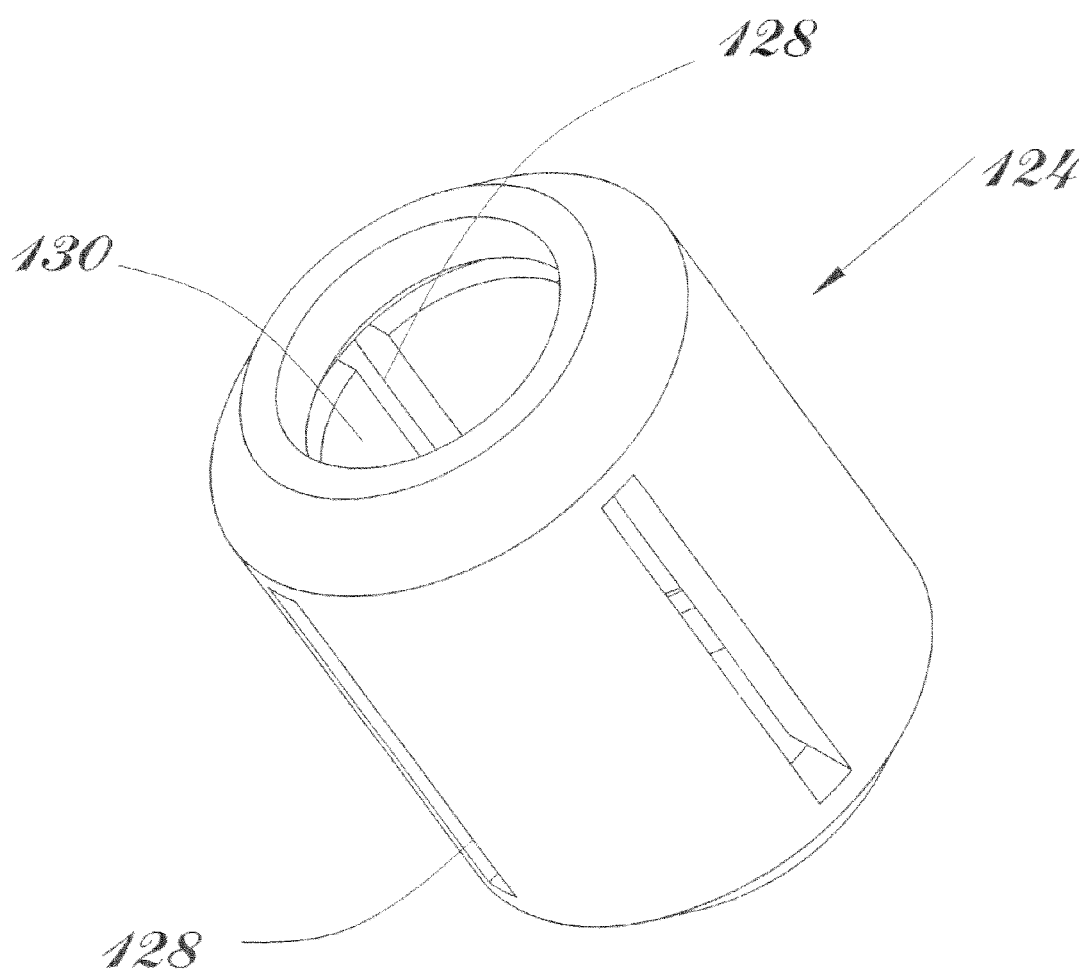
FIG. 11 is a perspective view of a poppet guide having a plurality of metering slots therein held in the housing of the flow shutoff valve of FIG. 8.

In comparing FIGS. 8, 9, and 10, it may be noted that the valve element 142 is shown in three functional positions. A first position, as illustrated in FIG. 8, is with the valve element 142 positioned fully toward the inlet 120, defining a valve closed position. A second position, as illustrated in FIG. 9, is an intermediate position with the metering slots 128 in communication with the inlet 120 and central section 132, defining a valve open position. The second position actually spans a range of locations for the valve element 142. A third position, as illustrated in FIG. 10, is with the sealing surface o-ring 148 pressed against the valve seat 138, defining a further valve closed position. In the first position, the metering slots 128 are closed by the upper portion of the cylindrical section 144 of the valve element 142. In this way, communication through the flow restrictive passage is closed. With no open passage, pressure builds up on the top of the valve element 142, which, in turn, acts as a piston and is forced downwardly by the water pressure every time the supply valve is opened. With the added force of the piston, the valve element 142 is cleared of any accumulation of particles and hardness on a regular basis. Further, the valve remains open with the sealing surface 148 displaced from the valve seat 138.

In the second position, flow proceeds relatively unimpeded by the mechanism with the exception of the design of the metering slots 128. Under normal flow conditions, the valve element 142 remains in this intermediate position. In the third position, the sealing surface 148 is on the valve seat 138 and there is no flow. It is through this range of positions that the valve 110 operates.

The spring 136 and the metering slots 128 are empirically selected to accommodate public water line pressure and household appliance, sink, and toilet flow rates. At normal flow, there is some pressure drop across the valve element 142. This pressure drop is due to flow resistance through the metering slots 128 and general drag of the valve element 142. This pressure drop, along with pressure imbalance resulting from velocity variations around the valve element 142, provides differential forces on the valve element 142. However, the metering slots 128 and the spring 136 are selected to allow a certain range of flow through the flow shutoff valve 110 at a range of line pressures with the spring 136 retaining the valve element 142 in the intermediate zone of positions. This is accomplished by having the spring 136 maintain a range of force on the valve element 142 that the hydraulic forces do not move the valve element 142 fully to the third position against the valve seat 138. Naturally, the spring 136 cannot resist the piston action of the valve element 142 as it moves from the first position to expose the metering slots 128, thus providing the self-cleaning action. As the public water line pressure is reasonably stable during such flow, the back pressure at outlet 122 significantly determines flow rate. This pressure is developed at an appliance, toilet valve, sink valve, or other device in fluid communication with outlet 122.

When the back pressure at the outlet 122 drops significantly, the differential pressure between the inlet 120 and the outlet 122 becomes substantially greater. In response, flow through the flow shutoff valve 10 increases. As the flow increases, greater resistance is provided by the metering slots 128. Resulting hydraulic forces acting in the direction of flow increase. At a flow rate between 150% and 200% of anticipated normal flow, the resulting hydraulic force on the valve element 142 exceeds the opposing spring force from the compressed spring 136. This is accomplished with some precompression of the spring 136 in the first position and a small spring constant. With the resulting hydraulic force exceeding the spring force, the valve element 142 will move to the third position with the sealing surface 148 against the annular valve seat 138. As the sealing surface 148 engages the valve seat 138, flow is terminated.

Once there is no flow, the pressure about the valve element 142 equalizes at the line pressure. At this point, the only forces on the valve element 142 are the spring 136 and the imbalance between the line pressure at the inlet 120 and the lower pressure at the outlet 122 operating the valve element 142 inwardly of the valve seat 138. With the outlet 122 being near zero gauge pressure, the differential pressure across the area of the outlet channel 140 retains the valve element 142 in the third position. Reinstating the flow shutoff valve to the first or second position is accomplished by reducing the line pressure sufficiently so that the spring 136 may force the valve element 142 back toward the inlet 120.

Figure 12:
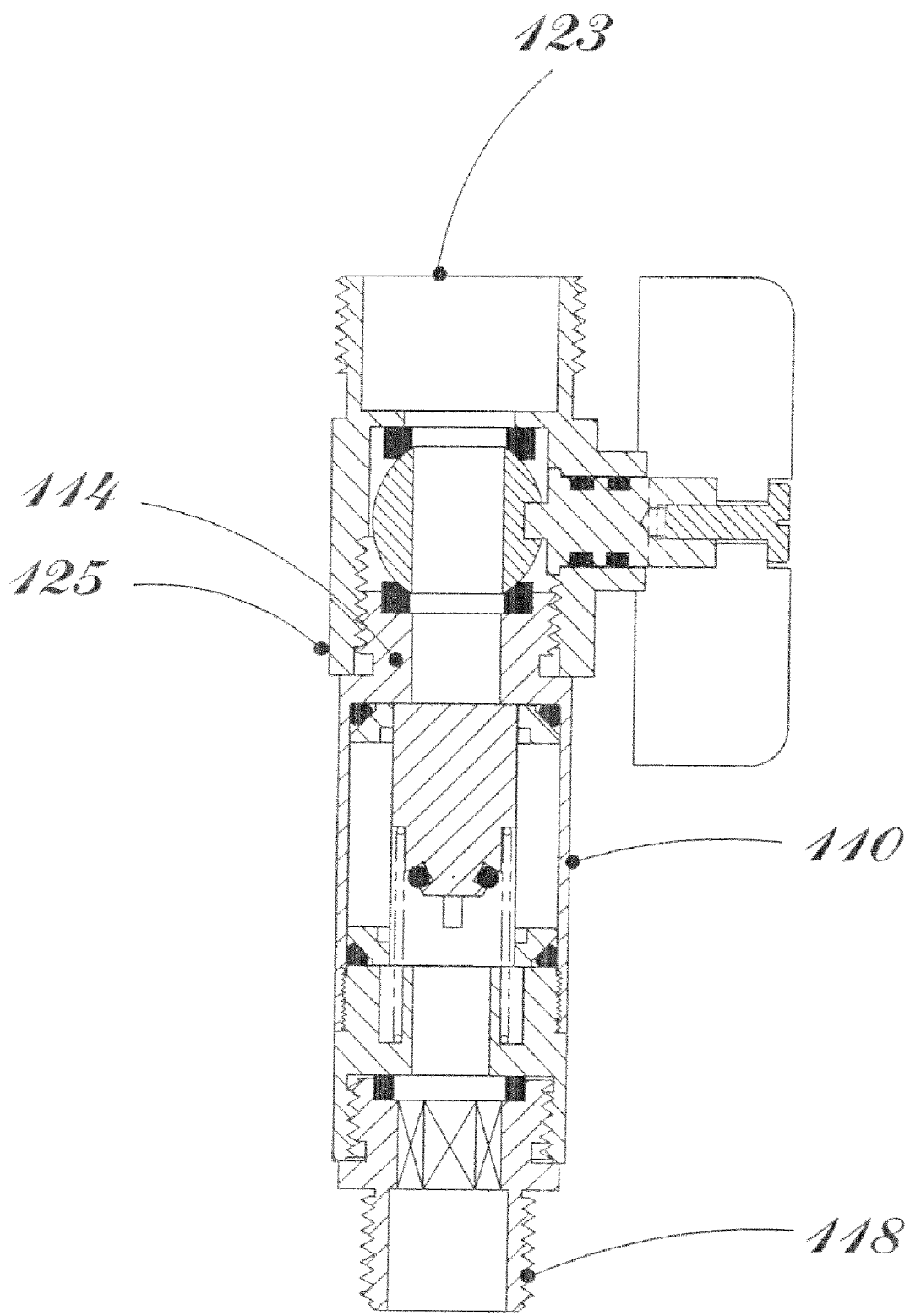
FIG. 12 is a cross-sectional view of the combination flow shutoff valve of FIG. 8 and a stop valve, with the flow shutoff valve, in a position with no flow therethrough.

FIG. 12 illustrates the connection or integration of flow shutoff valves 110 with stop valves 123. The exterior threads of the inlet section 114 are coupled to or inserted within female or internal threads formed on an outlet 125 of the stop valves 123 and retain a ball valve and O-ring or similar seal in place. The stop valves 123 may taken any known configuration, such as a ¼ turn stop valve, and are coupled to a water line (not shown), feeding water to the shutoff valve for delivery elsewhere. If water pressure downstream of the shutoff valve 110 drops to near zero gauge pressure, the flow shutoff valve 110 would close to cut off water flow, without the need to close the stop valves 123, except to reset the flow shutoff valve.

FIGS. 13-17 illustrate another embodiment of the present self-cleaning flow shutoff valve. The valve 210 includes a housing 212 that includes an upstream section 214 and a downstream section 216 that may be formed as separate, adjoining pieces. The sections 214, 216 may be bonded or threaded together, for example. Further, each section 214, 216 is shaped generally as a stepped cylinder. Those of ordinary skill in the art will appreciate, however, that the housing 212 need not include separate inlet and downstream sections, and that the housing 212 may embody any other shape, such as a non-circular cylinder.

The housing 212 defines an inlet 220, an outlet 222, and a flow passage 221 extending from the inlet 220 to the outlet 222. The passage 221 includes a large diameter section 230 located in the upstream section 214. The large diameter section 230 extends to an inlet 232 of the downstream section 216. The large diameter section 230 receives a flow-metering element 224, which is illustrated in detail in FIGS. 16 and 17. The illustrated flow-metering element 224 includes a generally cylindrical body wall or sleeve 225, and a cap section 227. The cap section 227, which is located at the downstream end 229 of the sleeve 225, is shaped substantially as a disk having a chamfer 231 on a downstream outer edge. A plurality of flow metering orifices 228 extends through the body wall 225 just upstream of the cap section 227. In the illustrated embodiment, eight circular orifices 228 are shown. However, those of ordinary skill in the art will appreciate that any number of orifices having any shapes may be used. An upstream end 233 of the sleeve 225 includes a plurality of L-shaped feet 235. In the illustrated embodiment, four feet 235 are shown. However, those of ordinary skill in the art will appreciate that any number of feet having any shape may be used.

Figure 13:
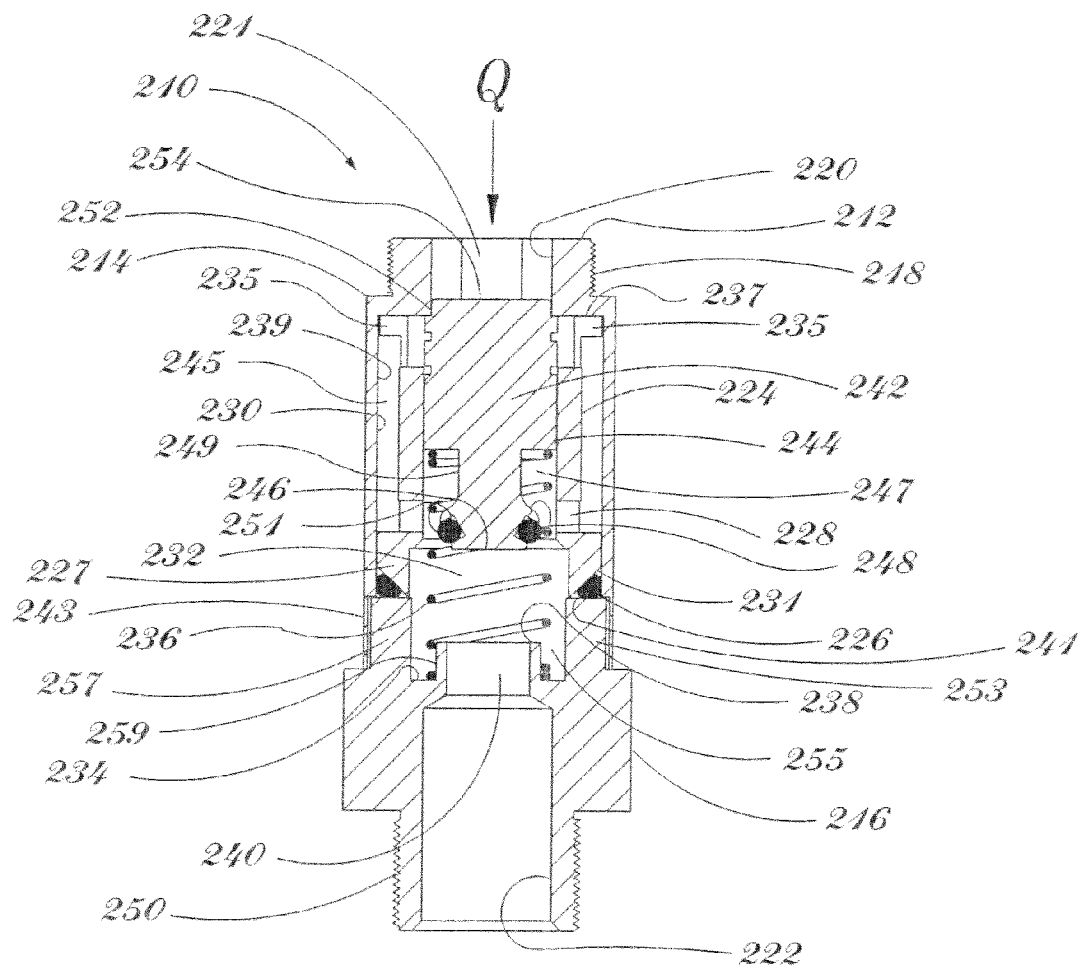
FIG. 13 is a side cross-sectional view of another embodiment of the present self-cleaning flow shutoff valve, in a position with no flow therethrough.
Figure 14:
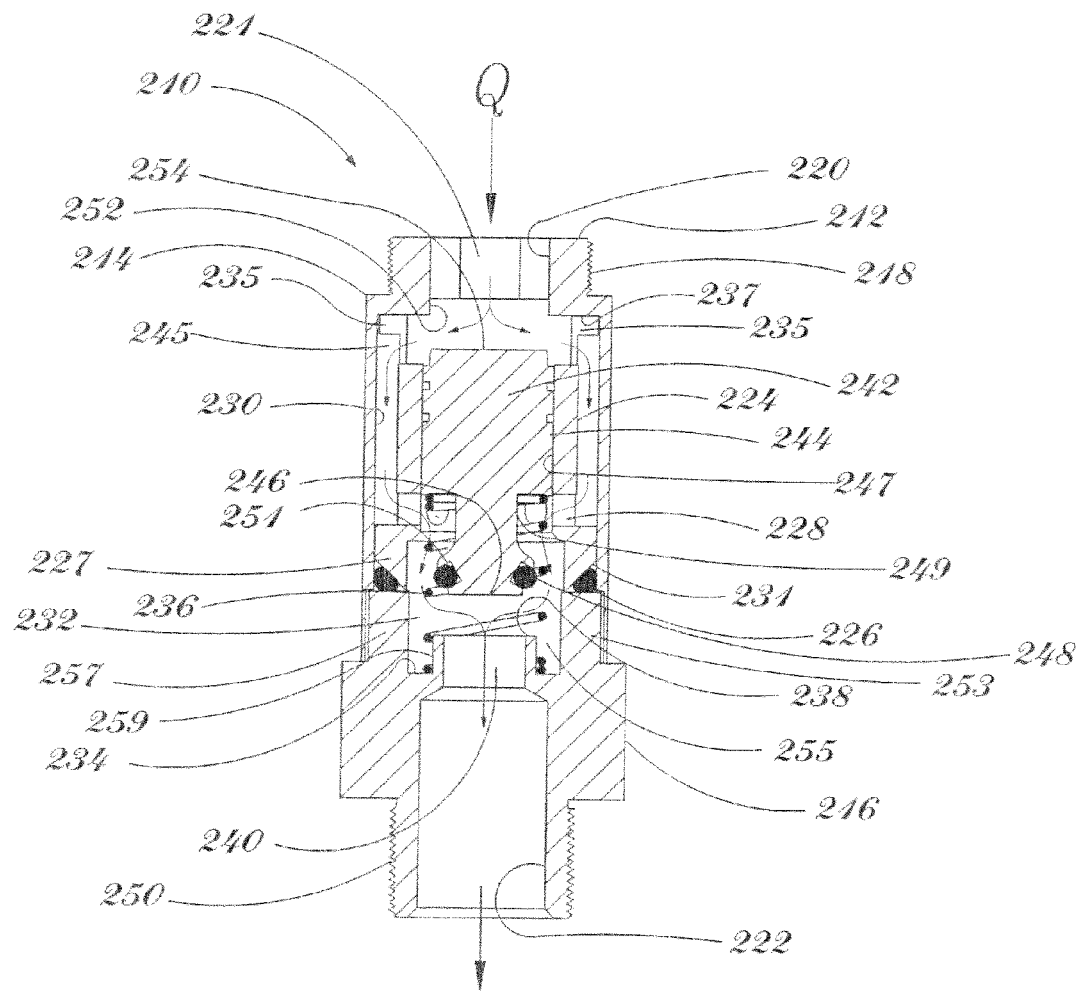
FIG. 14 is a side cross-sectional view of the self-cleaning flow shutoff valve of FIG. 13, in a normal flow position.
Figure 15:
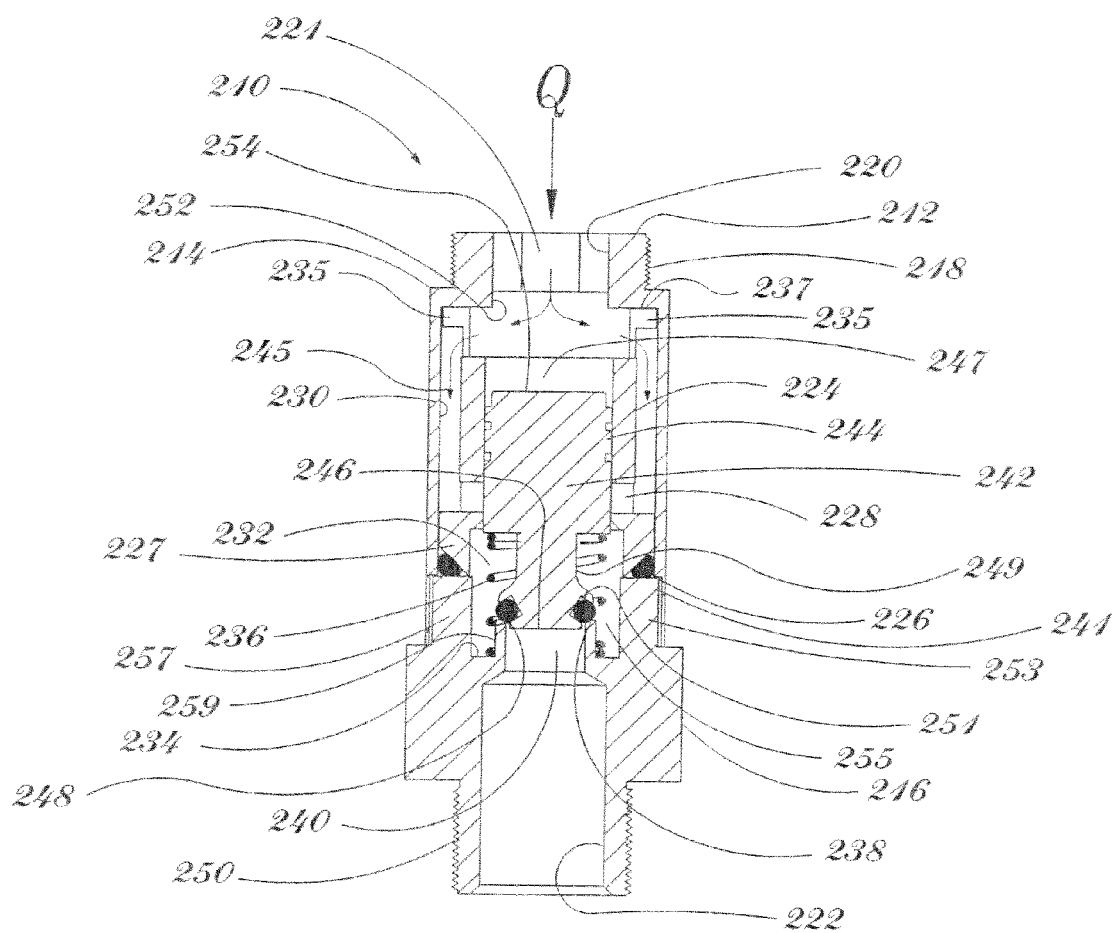
FIG. 15 is a side cross-sectional view of the self-cleaning flow shutoff valve of FIG. 13, in a shutoff position.
Figure 16:
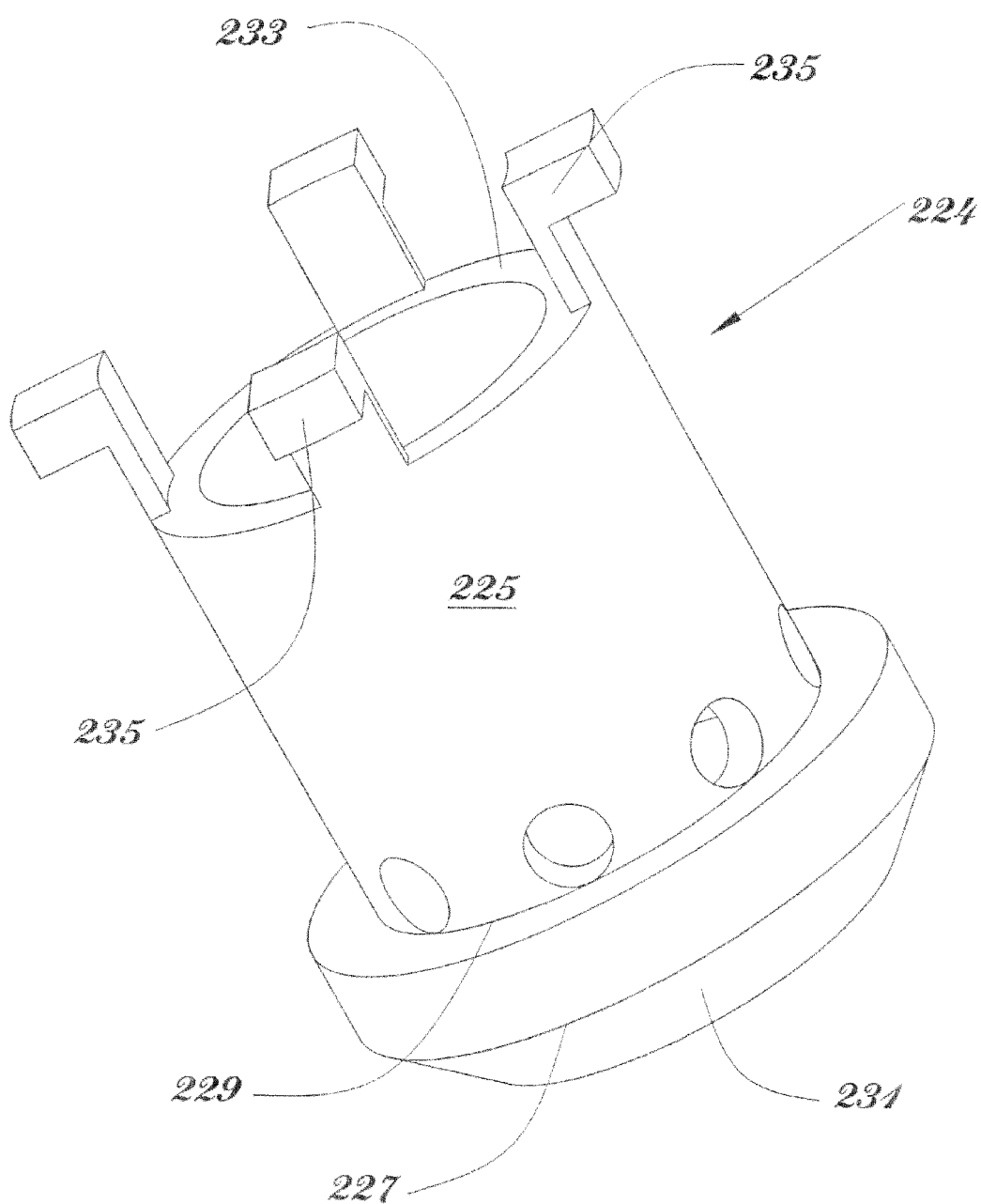
FIG. 16 is a bottom perspective view of a flow metering sleeve of the self-cleaning flow shutoff valve of FIG. 13.
Figure 17:
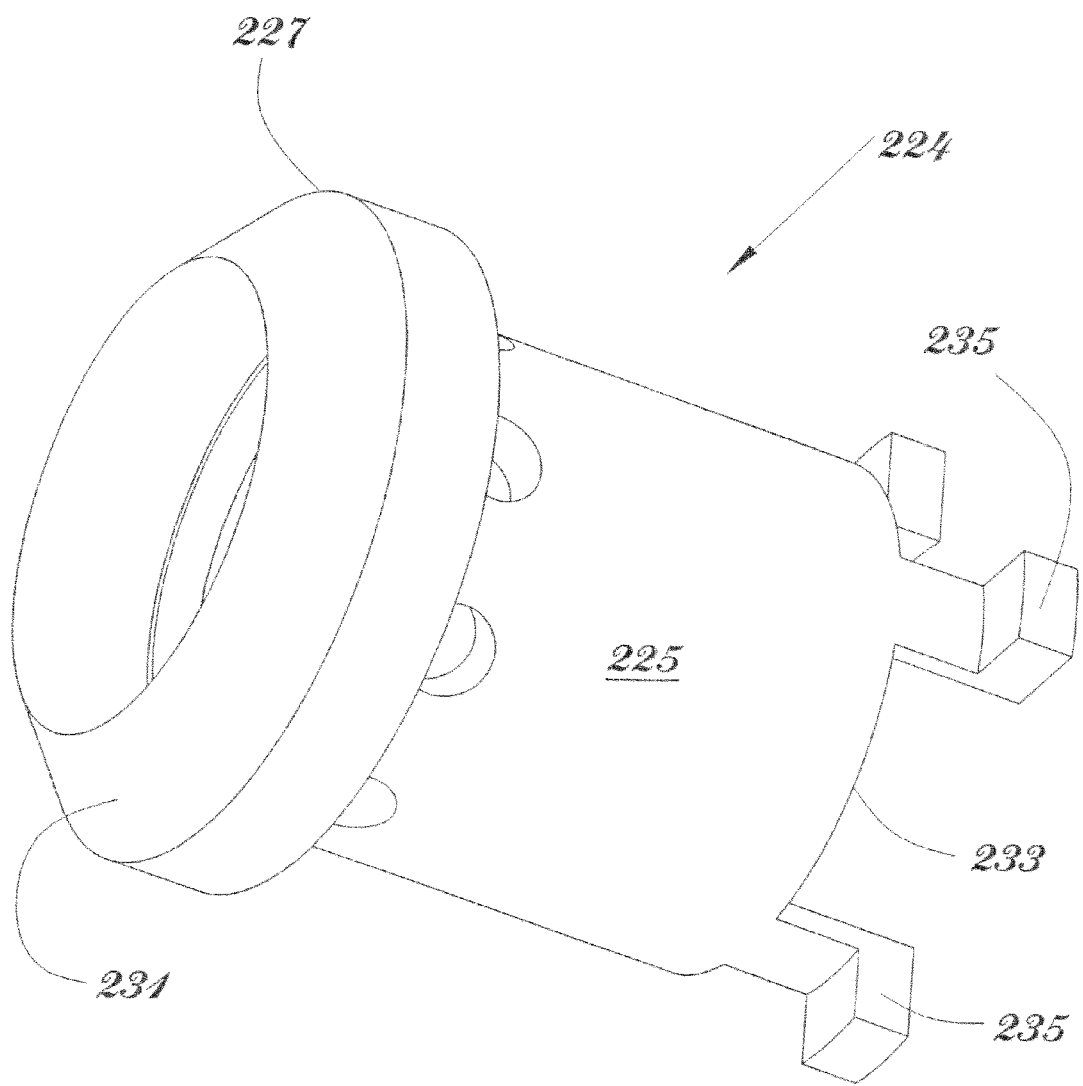
FIG. 17 is a top perspective view of the flow metering sleeve of FIG. 16.

As shown in FIGS. 13-15, the large diameter section 230 receives the flow-metering element 224, with the feet 235 abutting an upstream end wall 237 (FIG. 14) of the large diameter section 230. The feet 235 also abut an inner wall surface 239 (FIG. 13) of the large diameter section 230, substantially preventing any lateral movement of the element 224 within the large diameter section 230. The cap section 227 of the flow-metering element 224 abuts the downstream section 216, such that the element 224 cannot move along the longitudinal axis of housing 212. A sealing element 226 sandwiched between the chamfer 231 and an upstream end wall 241 (FIG. 13) of the downstream section 216 prevents water from passing around the outside of the cap section 227, and prevents water from leaking through the junction 243 of the upstream section 214 and the downstream section 216. The smaller diameter of the element 224 relative to the large diameter section 230 creates an annular space 245 through which water may flow as described in further detail below. In the illustrated embodiment, the sealing element 226 comprises a resilient O-ring. However, those of ordinary skill in the art will appreciate that the sealing element 226 could have other configurations.

An internal passage 247 of the flow-metering element 224 receives a valve element 242. In the illustrated embodiment, the valve element 242 is a poppet-type valve. However, those of ordinary skill in the art will appreciate that other types of valves may be used instead.

The valve element 242 is slidable along the axis of the element 224. In the illustrated embodiment, a body portion 244 of the valve element 242 is substantially cylindrical and sized to fit within the cylindrical passage 247 of the flow-metering element 224. The body portion 244 has a sufficient length and diameter so that is does not bind with the element 224 in axial movement. The body portion 244 also has a sufficient diameter to substantially prevent lateral movement of the valve element 242 relative to the element 224, and to prevent any substantial flow between the body portion 244 and the element 224. Those of ordinary skill in the art will appreciate that certain embodiments may allow some flow between the body portion 244 and the element 224.

The body portion 244 further contains a reduced diameter at its upstream end 254. The reduced diameter selectively fits into a counter-bored pocket 252 of the upstream section 214, as shown in FIG. 13 and as discussed in further detail below. A stem portion 249 of the valve element 242, located downstream of the body portion 244, includes a reduced diameter relative to the body portion 244. The stem portion 249 terminates in a sealing portion 246 spaced from the body portion 244. The sealing portion 246 includes a groove 251 in which a sealing element 248 seats. In the illustrated embodiment, the sealing element 248 comprises a resilient O-ring. However, those of ordinary skill in the art will appreciate that the sealing element 248 could have other configurations.

An upstream end 253 of the downstream section 216 of the housing 212 includes an annular cavity 255 formed between an outer cylindrical wall 257 and an inner cylindrical wall 259. An upstream end wall of the annular cavity 255 forms a seat 234 for a downstream end of a biasing member 236. In the illustrated embodiment, the biasing member 236 is a coil spring. However, those of ordinary skill in the art will appreciate that the biasing member 236 need not be a coil spring.

An upstream end of the biasing member 236 engages a downstream end wall of the body portion 244. The biasing member 236 is in compression, and thus biases the valve element 242 toward the upstream end of the housing 212. An upstream end of the inner cylindrical wall 259 forms a valve seat 238. The sealing element 248 selectively abuts the valve seat 238 to shut off flow through the valve 210, as shown in FIG. 15 and as described in further detail below.

FIGS. 13-15 illustrate three positions for the valve element 242, each of which corresponds to a different flow condition for the valve 210. FIG. 13 illustrates a no flow condition in which static line pressure is equalized throughout the valve 210 so that the valve element 242 is hydraulically balanced. In this condition the compressed biasing member 236 holds the valve element 242 at its farthest upstream position in which the reduced diameter upstream end 254 seats within the counter-bored pocket 252 of the upstream section 214. The sealing portion 246 is spaced from the valve seat 238. The valve element 242 does not cover the metering orifices 228.

FIG. 14 illustrates a normal flow condition in which the pressure downstream of the valve element 242 is lower than the pressure upstream of the valve element 242. Fluid flow across the metering orifices 228 may contribute to the lower pressure downstream. A flow rate through the valve 210 is below a threshold value at which the valve element 242 moves to the shutoff position shown in FIG. 15, which is described below. In the normal flow condition of FIG. 14, the valve element 242 is in an intermediate position, downstream from the no flow condition of FIG. 13. In the intermediate position of FIG. 14, the upstream end 254 of the valve element 242 is spaced from the counter-bored pocket 252. The compressed biasing member 236 counteracts the inlet biased water pressure to hold the valve element 242 in the intermediate position in which the sealing position 246 is spaced from the valve seat 238, and the body portion 244 does not cover the flow metering orifices 228. In this condition water flows through the inlet 220, around the upstream end 254 of the valve element 242 and into the annular space 245 between the element 224 and the inner wall surface of the large diameter section 230. The water then flows through the metering orifices 228, around the stem portion 249 and through the outlet 222. Those of ordinary skill in the art will appreciate that the normal flow condition encompasses a range of positions for the valve element 242, including positions in which the valve element 242 is upstream and/or downstream from the position illustrated in FIG. 14.

FIG. 15 illustrates a shutoff condition in which a differential pressure bears on the valve element 242. The difference between the normal flow condition of FIG. 14 and the shutoff condition of FIG. 15 is the magnitude of the flow rate. In FIG. 14 the flow rate is below the threshold value, while in FIG. 15 the flow rate is above the threshold value. When there is a sudden sharp decrease in the water pressure in the outlet channel 240, there is a sudden sharp increase in flow through the valve 210. Such a sharp increase in flow may occur, for example, when a downstream hose breaks. The sudden flow increase forces the valve element 242 downstream against the spring force. If the flow rate rises above the threshold value, the spring force is overcome, and the sealing portion 246 is forced against the valve seat 238. The sealing element 248 abutting the valve seat 238 prevents any flow through the valve seat 238. Further, the body portion 244 covers the metering orifices 228. As long as the differential pressure across the valve element 242 remains high enough, the valve element 242 remains in the shutoff condition where the sealing element 248 abutting the valve seat 238 prevents flow through the valve 210. When the differential pressure reduces, the biasing member 236 forces the valve element 242 back upstream into either the normal flow condition (FIG. 14) or the no flow condition (FIG. 13).

Advantageously, as the valve element 242 moves from the normal flow position (FIG. 14) to the shutoff position (FIG. 15), the body portion 244 covers the metering orifices 228 prior to the sealing element 248 reaching the valve seat 238. This action of the body 244 covering the orifices 228 is effectively a "spool" valve closure. However, because of the lack of seals and the clearance fit between the valve element body 244 and the internal passage 247 of the flow-metering element 224 there is significant bypass leakage. The bypass leakage tends to dampen the closure. Once the orifices 228 are covered by the body 244 of the valve element 242, the differential pressure across the valve element 242 rises even higher above the threshold value and the valve element 242 then continues downstream until the sealing element 248 reaches the valve seat 238, effecting complete closure. This sealing progression reduces "chatter," or oscillation of the valve element 242 along the axis of the valve 210.

As the discussion above illustrates, the present flow shutoff valve 210 includes a flow restrictive passage 221 extending between the inlet 220 and the outlet 222. Fluid communication through the valve 210 is at least partially controlled by the size and number of the metering orifices 228 in the element 224. The characteristics of the biasing member 236 and the metering orifices 228 are empirically selected to accommodate desired maximum flow rates. For example, in one embodiment the desired maximum flow rates may be those required by household appliances, sinks, and toilets. Under the normal flow condition, flow resistance through the metering orifices 228 and general drag of the valve element 242 create a pressure drop across the valve element 242. The pressure drop creates differential forces on the valve element 242. However, the metering orifices 228 and the biasing member 236 are selected to allow flow through the valve 210 within a range required by the specific fixture to which water flows through the valve 210, with the biasing member 236 retaining the valve element 242 in the normal flow position. The biasing member 236 maintains a range of forces on the valve element 242 that the hydraulic forces do not overcome until the threshold flow induced differential pressure is reached, after which the valve element 242 moves to the shutoff position in which the sealing element 248 abuts the valve seat 238.

The back pressure at the outlet 222 influences the flow rate through the valve 210. This pressure is developed at an appliance, toilet valve, sink valve, or other device in fluid communication with the outlet 222. When the back pressure at the outlet 222 drops significantly, the differential pressure between the inlet 220 and the outlet 222 becomes substantially greater. In response, flow through the flow shutoff valve 210 increases. As the flow increases, the metering orifices 228 provide greater resistance. Resulting hydraulic forces, acting in the direction of flow, increase. In one embodiment, the hydraulic force on the valve element 242 exceeds the threshold value at a flow rate between 150% and 200% of the anticipated normal flow rate. Under this condition the valve element 242 is forced into the shutoff position (FIG. 15) as the spring force from the compressed biasing member 236 is overcome.

In the shutoff position there is no flow through the valve 210, and the pressure above the valve element 242 equalizes at the line pressure. The only forces on the valve element 242 are from the biasing member 236 and from the imbalance between the line pressure at the inlet 220 and the lower pressure at the outlet 222. The differential pressure retains the valve element 242 in the shutoff position. By reducing the inlet line pressure sufficiently to allow the biasing member 236 to force the valve element 242 back toward the inlet 220, flow through the valve 210 is re-established.

One advantage of the present flow shutoff valve 210 is that it is self-cleaning. Public water lines generally contain sediment that can build up around valves and joints in the line, eventually creating flow-stopping clogs. In the present flow shutoff valve 210, the valve element 242 is in the no flow position (FIG. 13) when pressure about the valve element 242 is equalized. When a differential pressure is applied to valve element 242, as when there is a drop in pressure downstream from valve element 242, the valve "pops" open suddenly, creating a flow surge through the valve 210. The flow surge releases any accumulated particles in the valve 210 and flushes them downstream out of the valve 210. This flushing occurs every time the valve element 242 pops from the no flow position (FIG. 13) to the normal flow position (FIG. 14), such as when a downstream supply valve is opened.

Figure 18:
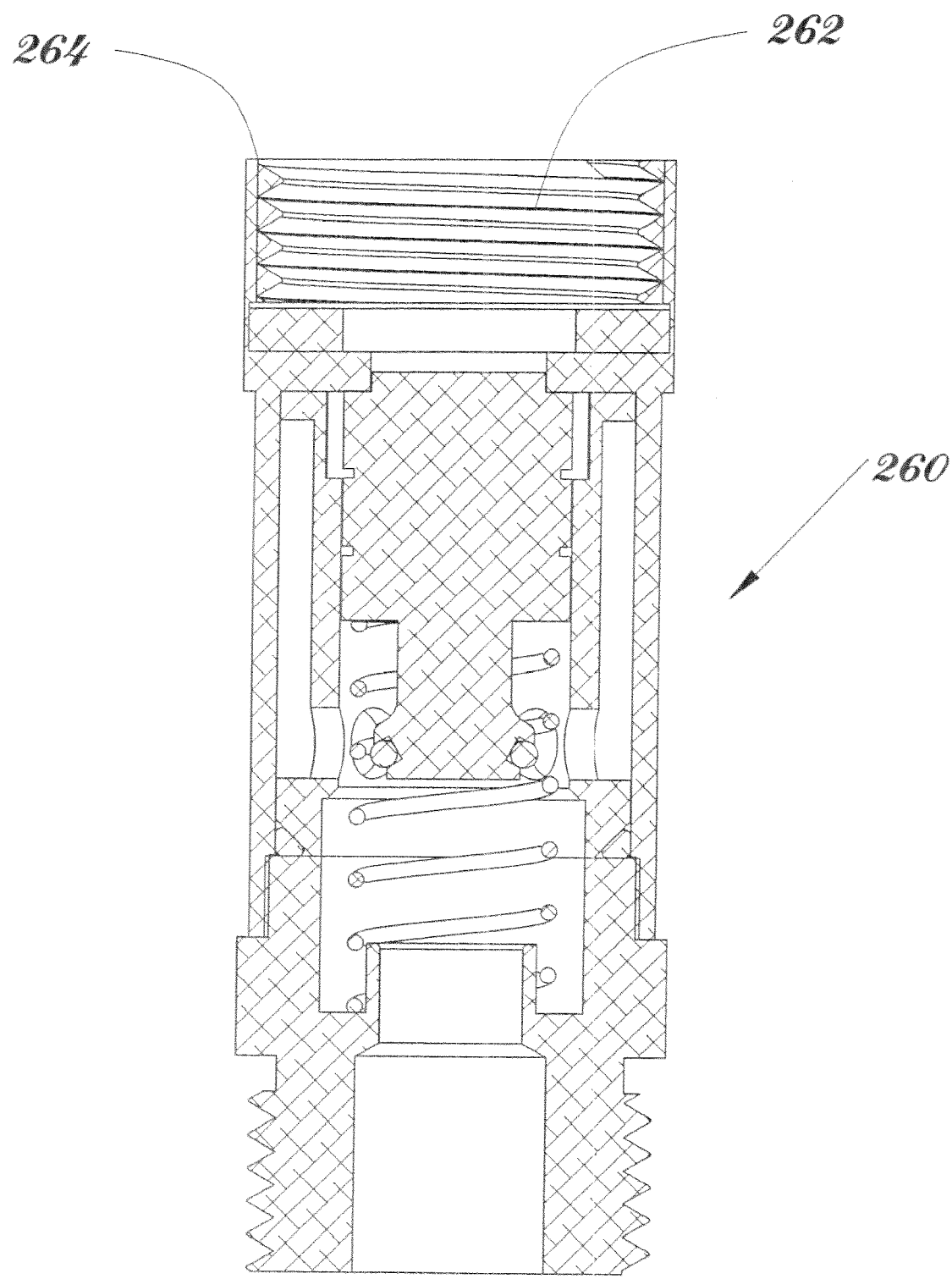
FIG. 18 is a side cross-sectional view of another embodiment of the present self-cleaning flow shutoff valve.

In the illustrated embodiment, the inlet 220 and the outlet 222 include male threads 218, 250. The inlet threads 218 may be configured to facilitate integration of the valve 210 into a standard commercial stop valve (not shown). The outlet threads 250 may be varied to match a broad range of plumbing requirements. In alternative embodiments, the valve 210 may be a non-integrated, stand-alone valve, in which case male or female threads may be provided at either end to fit any plumbing configuration. For example, FIG. 18 illustrates an alternative valve 260 having female threads 262 at an inlet end 264. The valve 260 is adapted for use with a clothes washer 66 (FIG. 6), which typically includes male threads on a water inlet hose.

Figure 19:
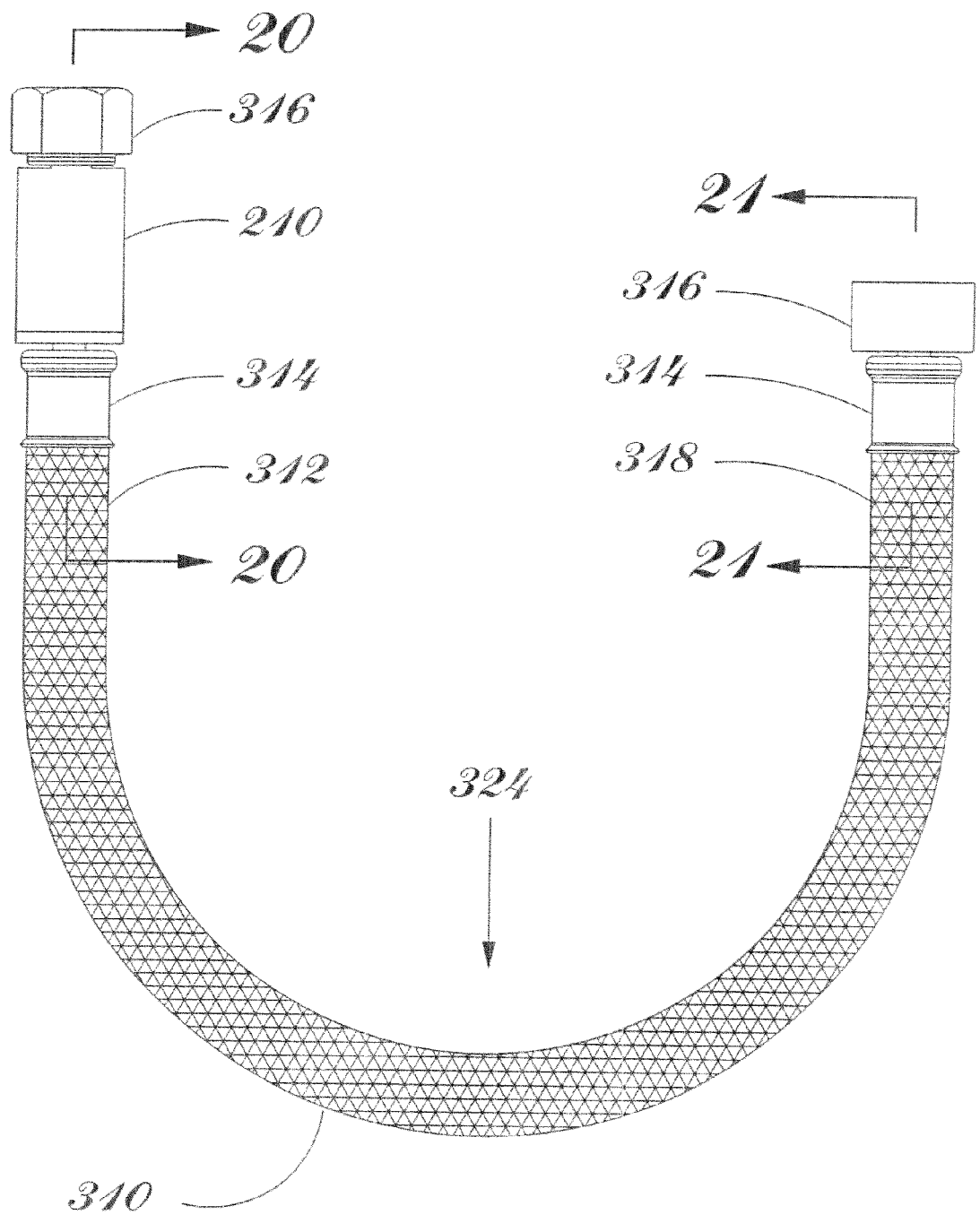
FIG. 19 is a side view of the self-cleaning flow shutoff valve of FIG. 13 integrated into a commercial appliance service hose.
Figures 20, 21:
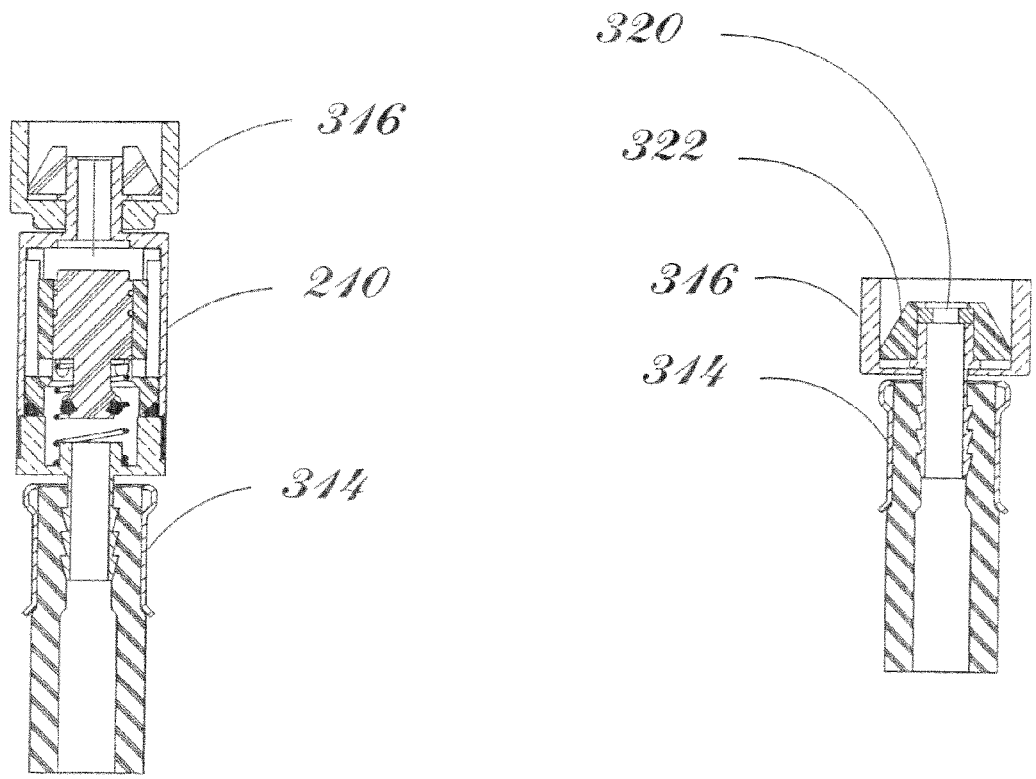
FIG. 20 is a side cross-sectional view of the inlet end of the hose of FIG. 19 taken along the line 20-20 of FIG. 19.
FIG. 21 is a side cross-sectional view of the outlet end of the hose of FIG. 19 taken along the line 21-21 of FIG. 19.

FIGS. 19-21 illustrate an alternative embodiment in which the present flow shutoff valve 210 is integrated into a commercial appliance service hose 310. With reference to FIGS. 19 and 20, an inlet end 312 of the hose 310 includes a crimp fitting 314 that engages and retains the valve 210. The inlet end 312 further includes a threaded fitting 316 upstream from the valve 210. With reference to FIGS. 19 and 21, an outlet end 318 includes a crimp fitting 314 that engages and retains a threaded fitting 316. With reference to FIG. 21, the fitting 316 includes a restrictive orifice 320 held in place by a modified commercial seal 322.

The hose assembly 324 is connectable to an appliance, such as a clothes washer 66 (FIG. 6), using the threaded fittings 316. The flow shutoff valve 210 is configured for a flow rate that is appropriate for the appliance with which it is used. For example, if it is used with a typical clothes washer, it may be sized for approximately 2½ gallons per minute (GPM) (9.6 liters per minute (LPM)) with a 3½ to 4 GPM (13.44 to 15.36 LPM) shutoff. Advantageously, the restrictive orifice 320 at the outlet end 318 of the hose assembly 324 restricts the actual flow rate through the hose to the desired rate. For example, if a hose having no restrictive orifice at the outlet end and a 2½ GPM (9.6 LPM) shutoff valve at the inlet end is installed on an appliance requiring 4 to 5 GPM (15.36 to 19.2 LPM), the shutoff valve would close prematurely. The restrictive orifice 320 on the hose assembly 324 restricts the actual flow to approximately 2½ to 3 GPM (9.6 to 11.52 LPM), thereby preventing premature closing of the shutoff valve.

Figure 22:
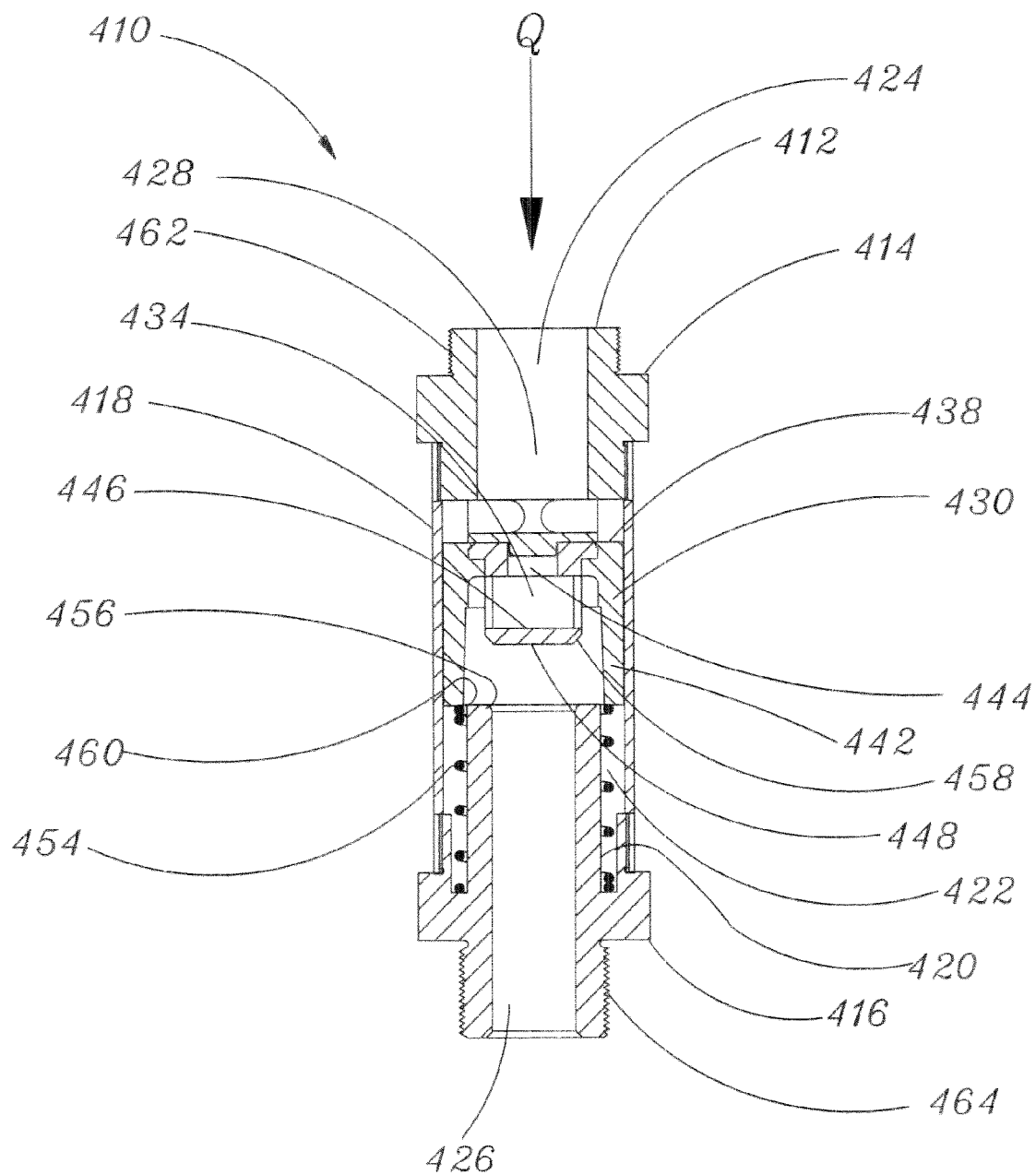
FIG. 22 is a side cross-sectional view of another embodiment of the present damped, self-cleaning flow shutoff valve, in a position with no flow therethrough.
Figure 23:
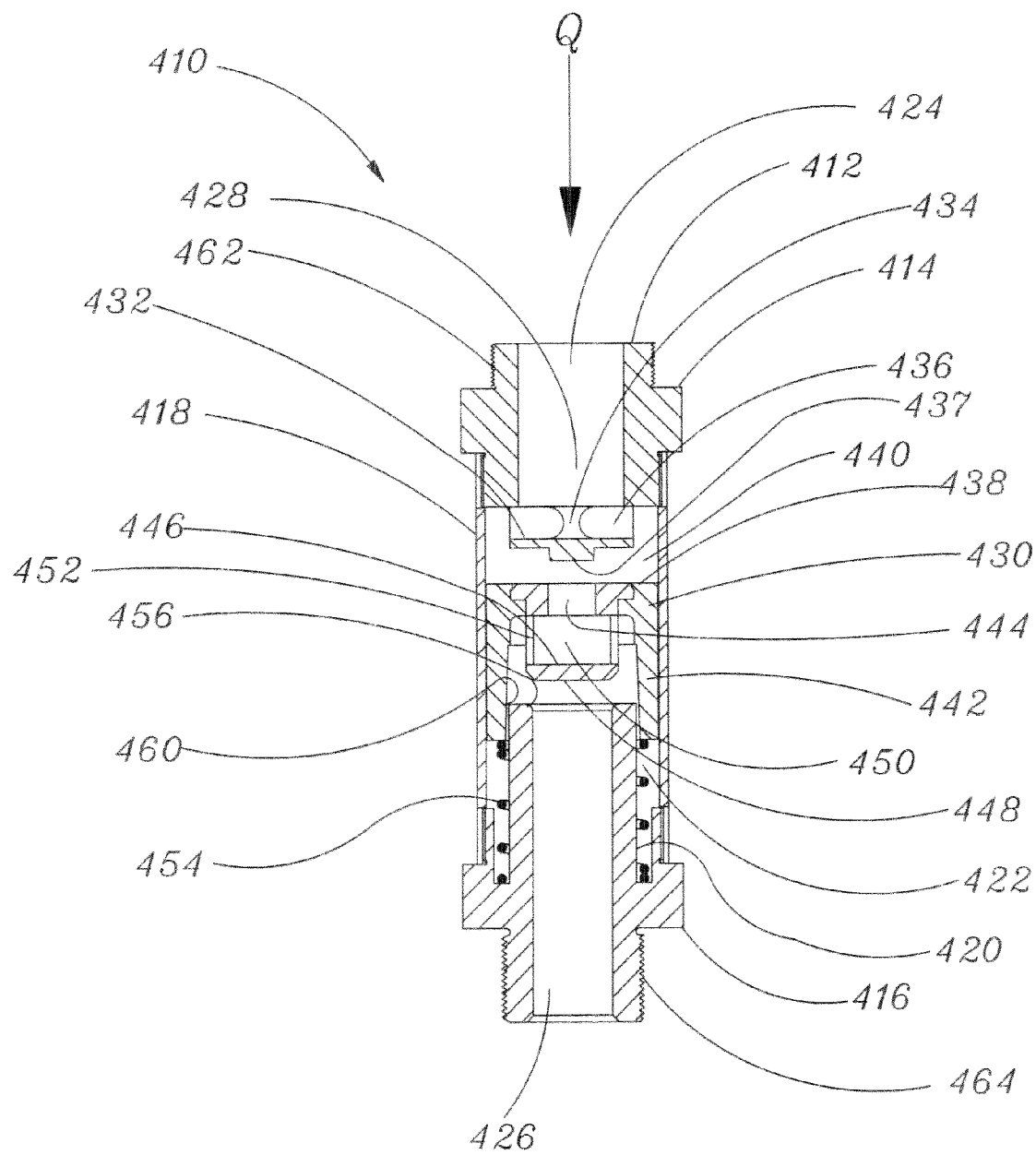
FIG. 23 is a side cross-sectional view of the damped, self-cleaning flow shutoff valve of FIG. 22, in a normal flow position.
Figure 24:
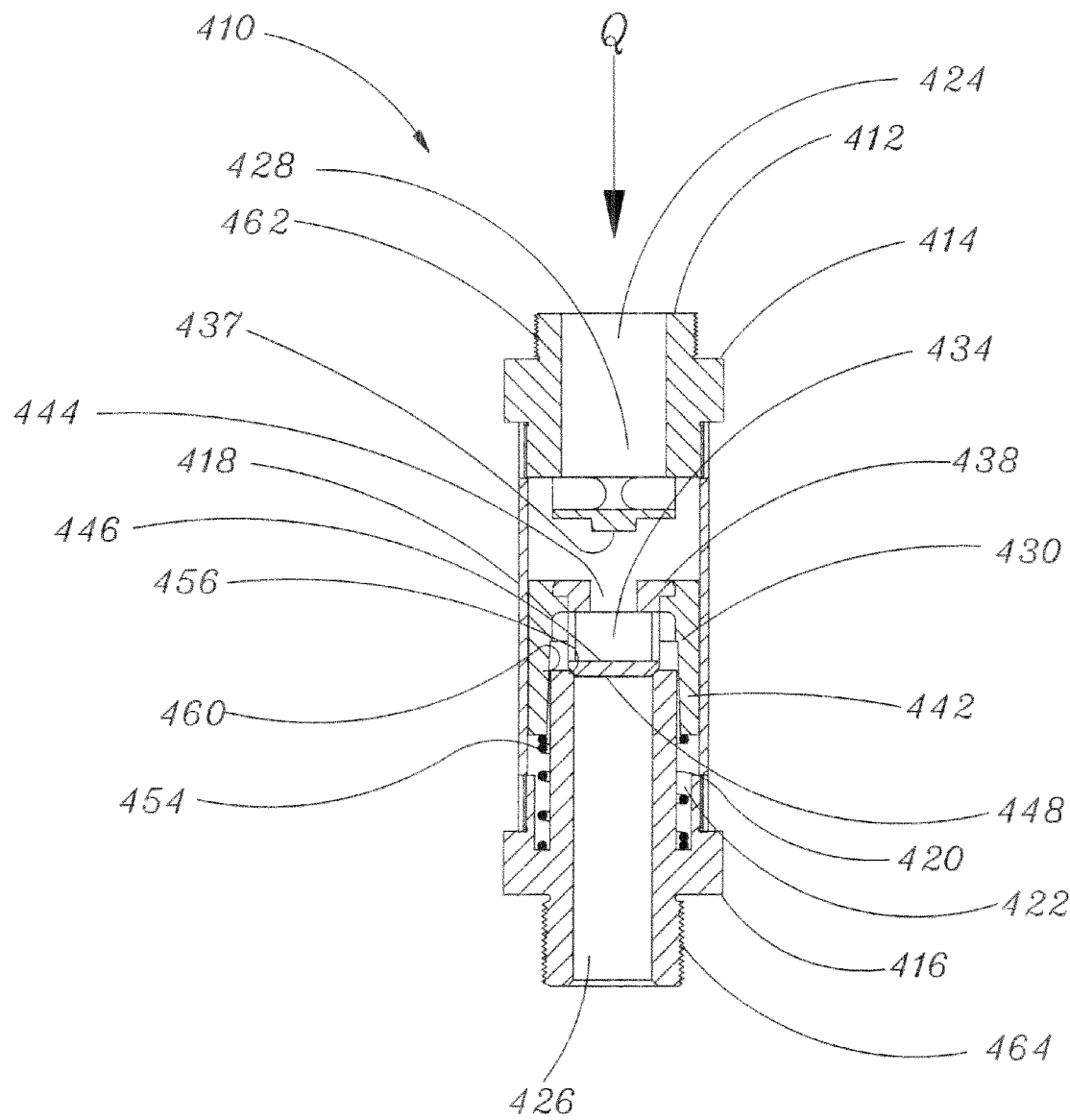
FIG. 24 is a side cross-sectional view of the damped, self-cleaning flow shutoff valve of FIG. 22, in a shutoff position.

FIGS. 22-24 illustrate another embodiment of the present self-cleaning flow shutoff valve 410. Advantageously, the valve 410 is damped so that there is a brief delay between the time a flow rate through the valve 410 first exceeds a threshold value and the time the valve 410 shuts off flow. This damping process is described below.

The valve 410 includes a housing 412 that includes an upstream section 414, a downstream section 416 and a sleeve 418 that may be formed as separate pieces. The sleeve 418 extends between and operatively connects the section 414, 416 to one another. The sections 414, 416 and the sleeve 418 may be connected to one another by conventional means, such as a friction fit, threads, welding, adhesive, etc. While not shown in FIGS. 22-24, one or more sealing members may be interposed at the junction between the upstream section 414 and the sleeve 418 and/or at the junction between the downstream section 416 and the sleeve 418.

The sleeve 418 defines an outer cylindrical wall of the housing 412. The upstream and downstream sections 414, 416 are each shaped generally as a stepped cylinder. The downstream section 416 includes an inner cylindrical wall 420 that is spaced from the sleeve 418, thus forming an annular cavity 422 between the inner cylindrical wall 420 and the sleeve 418. Those of ordinary skill in the art will appreciate that the housing 412 need not include separate upstream and downstream sections, and that the housing 412 may embody any other shape, such as a tubular shape with a non-circular cross-section.

The housing 412 defines an inlet 424, an outlet 426, and a flow passage 428 extending from the inlet 424 to the outlet 426. The flow passage 428 receives a valve element 430. In the illustrated embodiment, the valve element 430 is a poppet-type valve element. However, those of ordinary skill in the art will appreciate that other types of valve elements may be used instead.

With reference to FIG. 23, downstream from the inlet 424 the upstream section 414 includes an integral transverse wall portion 432. A plurality of legs 434 connects the transverse wall portion 432. A downstream face of the transverse wall portion 432 includes a central portion of increased axial thickness that forms a downstream-extending boss 437 (FIGS. 23 and 24) that functions as described below.

In the illustrated embodiment, the valve element 430 includes a body portion 438 sized to fit within the portion 440 (FIG. 23) of the cylindrical passage 428 defined by the sleeve 418. An annular skirt section 442 extends downstream from the body portion 438 and abuts the interior surface of the sleeve 418. The valve element 430 is dimensioned so as to be freely slidable axially within the sleeve 418 without binding during its axial movement. The valve element 430 advantageously has a sufficient diameter to prevent, or at least substantially limit, lateral movement of the valve element 430 relative to the sleeve 418, and to prevent any substantial flow between the valve element 430 and the sleeve 418. Those of ordinary skill in the art will appreciate that certain embodiments may allow some flow between the valve element 430 and the sleeve 418.

An upstream end of the valve element 430 includes an opening comprising a flow-restrictive passage 444 having an inside diameter sized to receive the plug portion 437 with a sealing fit. Downstream from the flow-restrictive passage 444 the valve element 430 further includes a closure element 446 having a downstream sealing surface 448. A plurality of legs 450 (FIG. 23) extends between and connects the end wall portion 446 to the body portion 438. The legs 450 define a plurality of downstream openings 452 that enable fluid flow around and past the end wall portion 446. In the illustrated embodiment, two legs 450 are shown, with two openings 452 between them (although only one opening 452 is visible in the figures). However, those of ordinary skill in the art will appreciate that any number of legs 450 and openings 452 could be provided.

The annular cavity 422 receives a biasing member 454 having a downstream end abutting the downstream section 416 of the housing 412, and an upstream end abutting the valve element 430. The biasing member 454 is in compression, and thus biases the valve element 430 toward the upstream section 414 of the valve housing 412. In the illustrated embodiment, the biasing member 454 is shown as a coil spring, but other types of biasing members will suggest themselves to those of ordinary skill in the art.

An interior edge of the upstream end of the inner cylindrical wall 420 includes a chamfer that forms a valve seat 456. An outer edge of the sealing surface 448 also includes a chamfer 458 (FIG. 22). The chamfer on the valve seat 456 is configured to selectively engage the chamfer 458 on the sealing surface 448 to shut off flow through the valve 410, as shown in FIG. 24 and as described in further detail below.

FIGS. 22-24 illustrate three positions for the valve element 430, each of which corresponds to a different flow condition for the valve 410. FIG. 22 illustrates a "no flow" or closed condition in which static line pressure is equalized throughout the valve 410 so that the valve element 430 is hydraulically balanced. In this condition the compressed biasing member 454 holds the valve element 430 at its farthest upstream position in which the boss 437 is received in the flow-restrictive passage 444 in the valve element 430, thereby functioning as a plug for the upstream end of the passage 444, while the closure portion 446 is spaced from the valve seat 456. In this configuration, the valve 410 is closed to the passage of fluid.

FIG. 23 illustrates a normal flow condition in which the pressure downstream of the valve element 430 is lower than the pressure upstream of the valve element 430. A flow rate through the valve 410 is below a threshold value at which the valve element 430 moves to the shutoff position shown in FIG. 24, which is described below. In the normal flow condition of FIG. 23, the force of water flowing through the valve bears on the upstream face of the valve element 430 as well as on the upstream face of the closure portion 446. The valve element 430 is thus moved axially, against the force of the biasing member 454, to an intermediate position, downstream from the "no flow" condition of FIG. 22. In the intermediate position of FIG. 23, the upstream end 438 of the valve element 430 is spaced from the transverse wall portion 432, and the plug portion 437 is removed from the flow-restrictive passage 444, thereby opening the latter to fluid flow. The compressed biasing member 454 counteracts the inlet-biased water pressure to hold the valve element 430 in the intermediate position in which the closure portion 446 is spaced from the valve seat 456. In this condition water flows through the inlet 424, past the transverse wall portion 432, through the upstream openings 436 and the flow-restrictive passage 444, through the downstream openings 452 and past the closure portion 446 and to the outlet 426. Properties of the valve element 430, such as the diameter of the restrictive flow passage 444 and the spacing between the valve element body portion 430 and the closure portion 446, can be tailored to retain the valve element 430 in the intermediate position under expected flow conditions. Those of ordinary skill in the art will appreciate that the normal flow condition encompasses a range of positions for the valve element 430, including positions in which the valve element 430 is upstream and/or downstream from the position illustrated in FIG. 23.

FIG. 24 illustrates a shutoff condition in which a differential pressure bears on the valve element 430. The difference between the normal flow condition of FIG. 23 and the shutoff condition of FIG. 24 is the magnitude of the flow rate. In FIG. 23 the flow rate is below a threshold value, while in FIG. 24 the flow rate is above the threshold value. When there is a sudden sharp decrease in the water pressure at the outlet 426, there is a sudden sharp increase in flow through the valve 410. Such a sharp increase in flow may occur, for example, when a conduit or hose breaks downstream from the valve 410. The sudden flow increase forces the valve element 430 downstream against the biasing force of the biasing member 454. If the flow rate rises above the threshold value, the biasing force is overcome, and the sealing surface 338 of the closure element 446 is forced against the valve seat 456, thereby blocking fluid flow past the valve seat 456 into the outlet 426. As long as the differential pressure across the valve element 430 remains high enough, the valve element 430 remains in this shutoff condition that prevents flow through the valve 410. When the differential pressure decreases, the biasing member 454 forces the valve element 430 back upstream into either the normal flow condition (FIG. 23) or the "no flow" condition (FIG. 22).

Advantageously, as the valve element 430 moves from the normal flow position (FIG. 23) to the shutoff position (FIG. 24), the skirt section 442 advances farther and farther into the annular cavity 422. The skirt section 442 displaces fluid from the annular cavity 422 as it advances farther (in the downstream direction) into the annular cavity 422. Since the annular cavity 422 is closed at its downstream end, the displaced fluid is forced to flow upstream through a narrow gap 460 between the inner cylindrical wall 420 and the inner surface of the sleeve 418. Because the gap 460 is narrow relative to the width of the annular cavity 422, the fluid in the annular cavity 422 squeezes through the gap 460 at a relatively high velocity, but a relatively low volumetric flow rate. This low flow rate slows down the rate at which the fluid can be evacuated from the annular cavity 422, which in turn slows down the rate at which the valve element 430 can move from the intermediate position of FIG. 23 to the shutoff position of FIG. 24. The valve element's movement is thus damped in this range of movement. The relative dimensions of the annular cavity 422 and the gap 460, as well as other characteristics of the biasing member 454, the valve element 430 and the inner cylindrical wall 420, can be empirically selected to accommodate a desired damping.

In the illustrated embodiment, the skirt section 442 has a slight taper on its inner surface. The diameter of the inner surface decreases with increasing distance from the downstream end. Thus, when the valve element 430 is in the extreme upstream position of FIG. 22, the width of the gap 460 between the inner cylindrical wall 420 and the skirt section 442 is relatively large. As the valve element 430 moves downstream, the tapered inner wall of the skirt section 442 causes the width of the gap 460 to become progressively smaller. This taper produces a variable damping rate for the valve 410, whereby, as the valve element 430 moves downstream, the damping rate increases. Those of ordinary skill in the art will appreciate that in other embodiments the skirt section 442 may not include a taper.

The damping achieved by the valve 410 advantageously reduces the likelihood that flow through the valve 410 will be shutoff when the excess flow condition is merely transient. For example, an excess flow condition may be caused by substantially empty pipes or entrapped air, as may occur in a lawn irrigation system. The time delay in flow shutoff achieved by the valve 410 keeps the valve 410 open until normal flow is achieved. If the excess flow continues beyond a threshold time, the valve 410 shuts off flow.

The physical characteristics and dimensions of the biasing member 454, the valve element 430 and the plugging boss 437 can be empirically selected to accommodate desired maximum flow rates. For example, in one embodiment, the desired maximum flow rates may be those required by household appliances, sinks, and toilets. Under the normal flow condition, flow resistance through the valve element 430 and general drag on the valve element 430 create a pressure drop across the valve element 430. The pressure drop creates differential forces on the valve element 430. However, the biasing member 454 is selected to allow flow through the valve 410 within a range required by the specific fixture to which water flows through the valve 410, with the biasing member 454 retaining the valve element 430 in the normal flow position. The biasing member 454 maintains a range of force on the valve element 430 that the hydraulic forces do not overcome until the threshold flow-induced differential pressure is reached, after which the valve element 430 moves to the shutoff position in which the sealing element 448 abuts the valve seat 456.

The back pressure at the outlet 426 influences the flow rate through the valve 410. This pressure is developed at an appliance, toilet valve, sink valve, or other device in fluid communication with the outlet 426. When the back pressure at the outlet 426 drops significantly, the differential pressure between the inlet 424 and the outlet 426 becomes substantially greater. In response, flow through the flow shutoff valve 410 increases. Resulting hydraulic forces, acting in the direction of flow, increase. In one embodiment, the hydraulic force on the valve element 430 exceeds the threshold value at a flow rate between 150% and 200% of the anticipated normal flow rate. Under this condition the valve element 430 is forced into the shutoff position (FIG. 24) as the spring force from the compressed biasing member 454 is overcome.

In the shutoff position there is no flow through the valve 410, and the pressure above the valve element 430 equalizes at the line pressure. The only forces on the valve element 430 are from the biasing member 454 and from the imbalance between the line pressure at the inlet 424 and the lower pressure at the outlet 426. The differential pressure retains the valve element 430 in the shutoff position. By reducing the inlet line pressure sufficiently to allow the biasing member 454 to force the valve element 430 back toward the inlet 424, flow through the valve 410 is re-established.

One advantage of the present flow shutoff valve 410 is that it is self-cleaning. Public water lines generally contain sediment that can build up around valves and joints in the line, eventually creating flow-stopping clogs. In the present flow shutoff valve 410, the valve element 430 is in the "no flow" position (FIG. 22) when pressures on the upstream and downstream sides of the valve element 430 are equalized. In this position, the plugging boss 437 is disposed in the flow restrictive passage 444, and flow through the valve 410 is closed. The valve element 430 may be retained in the extreme upstream position by providing some precompression in the biasing member 454. With no open flow passage, pressure builds up on the upstream face of the valve element 430. When a differential pressure is applied to the valve element 430, as when there is a drop in pressure downstream from valve element 430, the valve "pops" open suddenly, creating a flow surge through the valve 410. The flow surge releases any accumulated particles in the valve 410 and flushes them downstream out of the valve 410. This flushing occurs every time the valve element 430 pops from the no flow position (FIG. 22) to the normal flow position (FIG. 23), such as when a downstream supply valve is opened. In one embodiment the popping action can be provided by a biasing member 454 with a small spring constant.

In the illustrated embodiment, the inlet 424 and the outlet 426 include male threads 462, 464. The inlet threads 462 may be configured to facilitate integration of the valve 410 into a standard commercial stop valve (not shown). The outlet threads 464 may be selected to match a broad range of plumbing requirements. In alternative embodiments, the valve 410 may be a non-integrated, stand-alone valve, in which case male or female threads may be provided at either end to fit any plumbing configuration.

The above description presents the best mode contemplated for carrying out the present damped, self-cleaning flow shutoff valve and associated methods, and of the manner and process of making and using it, in such full, clear, concise, and exact terms as to enable any person skilled in the art to which it pertains to make and use this valve. This valve is, however, susceptible to modifications and alternate constructions from that discussed above that are fully equivalent. Consequently, this valve is not limited to the particular embodiments disclosed. On the contrary, this valve covers all modifications and alternate constructions coming within the spirit and scope of the valve as generally expressed by the following claims, which particularly point out and distinctly claim the subject matter of the valve.

What is claimed is:

1. A damped, self-cleaning flow shutoff valve configured to be installed in a water line to stop flow in response to an excess water flow condition, the valve comprising:
   a housing defining a flow passage, an outer cylindrical wall, an inner cylindrical wall, and a valve seat;
   an annular cavity formed between the outer cylindrical wall and the inner cylindrical wall;
   a valve member slidably mounted within the housing, the valve member including an annular skirt section extending in the downstream direction, a downstream-facing portion of the valve member comprising a sealing portion configured to selectively engage the valve seat, the valve member being movable between an upstream no flow position, a downstream shutoff position, and a normal flow position intermediate the no flow position and the shutoff position; and
   a biasing element disposed between the housing and the valve member so as to bias the valve member away from the valve seat;
   wherein when the valve member moves from the normal flow position to the shutoff position, the annular skirt section penetrates the annular cavity and displaces water therefrom to dampen the downstream movement of the valve member.

2. The flow shutoff valve of claim 1, wherein the housing comprises an upstream section and a downstream section.

3. The flow shutoff valve of claim 2, wherein the upstream and downstream sections are separate components that are operatively connected to one another.

4. The flow shutoff valve of claim 1, wherein a portion of the housing located downstream from the valve member defines the valve seat.

5. The flow shutoff valve of claim 1, wherein the sealing portion on the valve member includes a first chamfer about its outer edge and the valve seat includes a second chamfer about its inner edge and the first and second chamfers engage one another to prevent flow through the valve when the valve member is in the shutoff position.

6. The flow shutoff valve of claim 1, wherein the valve member includes an opening at its upstream end, a wall portion forming a downstream barrier, and at least one opening in a sidewall portion between the upstream end and the downstream barrier.

7. The flow shutoff valve of claim 6, wherein the housing includes a protruding boss facing downstream, and the boss engages the upstream opening in the valve member when the valve member is in the no flow position.

8. The flow shutoff valve of claim 1 in combination with a hose, the flow shutoff valve being integrated into an inlet end of the hose.

9. The flow shutoff valve/hose combination of claim 8, further comprising a flow-restricting orifice at an outer end of the hose.

10. A method of stopping flow in a water line in response to an excess water flow condition, the method comprising:
   beginning with a flow shutoff valve in the water line in an upstream no flow position in which a protruding boss on a housing of the valve engages an opening in an upstream end of a valve member, and a sealing portion of the valve member is spaced from a valve seat located downstream of the valve member;
   creating a differential pressure across the valve member in which a downstream water pressure is less than an upstream water pressure to move the valve member to a normal flow position in which the upstream end of the valve member is spaced from the boss, and the sealing portion is spaced from the valve seat; and
   increasing a water flow rate across the valve member above a threshold flow rate to move the valve member to a downstream shutoff position in which the upstream end of the valve member is spaced from the boss, and the sealing portion engages the valve seat;
   wherein the housing defines the valve seat, an annular cavity is formed between a wall of the housing and a wall of the valve seat, and the valve member includes an annular skirt section extending in the downstream direction; and
   wherein as the valve member moves from the normal flow position to the shutoff position, the annular skirt section penetrates the annular cavity and displaces water therefrom to dampen the downstream movement of the valve member.

11. The method of claim 10, wherein when the valve member moves from the no flow position to the normal flow position movement of the valve element and a sudden surge of water through the valve purges sediment from the valve.

12. The method of claim 10, wherein the housing comprises an upstream section and a downstream section.

13. The method of claim 12, wherein the upstream and downstream sections are separate components that are operatively connected to one another.

14. The method of claim 10, wherein a portion of the housing located downstream from the valve member defines the valve seat.

15. The method of claim 10, wherein the sealing portion on the valve member includes a first chamfer about its outer edge and the valve seat includes a second chamfer about its inner edge and the first and second chamfers engage one another to prevent flow through the valve when the valve member is in the shutoff position.

16. The method of claim 10, wherein the valve member includes a wall portion forming a downstream barrier, and at least one opening in a sidewall portion between the upstream end and the downstream barrier.

* * * * *